US009363676B2

(12) United States Patent
Guccione et al.

(10) Patent No.: US 9,363,676 B2
(45) Date of Patent: Jun. 7, 2016

(54) SMART CARD WITH DOMAIN-TRUST EVALUATION AND DOMAIN POLICY MANAGEMENT FUNCTIONS

(75) Inventors: Louis J. Guccione, East Chester, NY (US); Michael V. Meyerstein, Ipswich (GB); Inhyok Cha, Seoul (KR); Andreas Schmidt, Frankfurt am Main (DE); Andreas Leicher, Frankfurt (DE); Yogendra C. Shah, Exton, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 224 days.

(21) Appl. No.: 13/991,530

(22) PCT Filed: Dec. 6, 2011

(86) PCT No.: PCT/US2011/063423

§ 371 (c)(1),
(2), (4) Date: Dec. 16, 2013

(87) PCT Pub. No.: WO2012/078570

PCT Pub. Date: Jun. 14, 2012

(65) Prior Publication Data

US 2014/0179271 A1    Jun. 26, 2014

Related U.S. Application Data

(60) Provisional application No. 61/420,162, filed on Dec. 6, 2010.

(51) Int. Cl.
*H04L 29/06* (2006.01)
*H04W 12/08* (2009.01)
(Continued)

(52) U.S. Cl.
CPC ............... *H04W 12/12* (2013.01); *G06F 21/10* (2013.01); *H04L 63/00* (2013.01); *H04W 12/08* (2013.01); *H04W 12/10* (2013.01)

(58) Field of Classification Search
CPC . H04L 63/08; H04L 63/0823; H04L 63/0869; H04L 63/205; H04L 67/14; H04L 63/102; H04L 63/10; H04L 9/0877; H04L 12/24; H04L 45/00; H04L 63/0853; H04L 63/00; H04L 63/04; H04L 63/105; H04L 9/3263; H04L 9/083; G06Q 20/3552; G06Q 10/06311; G06Q 20/341; G06Q 20/3576; G06Q 20/3563; G06Q 20/3574; G06F 21/604; G06F 21/62; G06F 2221/2119; G06F 21/77; H04W 12/04; H04W 12/06; H04W 12/08; H04W 12/12; H04M 15/49

See application file for complete search history.

(56) References Cited

U.S. PATENT DOCUMENTS 6,005,942 A * 12/1999 Chan et al. ................... 713/187
7,140,039 B1 * 11/2006 Yemeni et al. ................... 726/9
(Continued)

FOREIGN PATENT DOCUMENTS

CN          1805336         7/2006
CN        101729244         6/2010
(Continued)

OTHER PUBLICATIONS

U.S. Appl. No. 61/309,569, filed Mar. 2, 2010, Guccione et al.
(Continued)

*Primary Examiner* — Nizar Sivji
(74) *Attorney, Agent, or Firm* — Baker & Hostetler LLP

(57) ABSTRACT

One or more wireless communications device may include one or more domains that may be owned or controlled by one or more different owners. One of the domains may include a security domain having ultimate control over the enforcement of security policies on the one or more wireless communications devices. Another one of the domains may include a system-wide domain manager that is subsidiary to the security domain and may enforce the policies of one or more subsidiary domains. The system-wide domain manager may enforce its policies based on a privilege level received from the security domain. The privilege level may be based on the level of trust between an external stakeholder, such as an owner of a domain that is subsidiary to the system-wide domain manager, and the security domain.

18 Claims, 19 Drawing Sheets

(51) Int. Cl.
*H04W 12/12* (2009.01)
*G06F 21/10* (2013.01)
*H04W 12/10* (2009.01)

(56) References Cited

U.S. PATENT DOCUMENTS

| | | | |
|---|---|---|---|
| 2002/0040936 A1* | 4/2002 | Wentker et al. | 235/492 |
| 2005/0120219 A1* | 6/2005 | Munetoh et al. | 713/176 |
| 2009/0077643 A1 | 3/2009 | Schmidt | |
| 2010/0062808 A1* | 3/2010 | Cha et al. | 455/558 |
| 2011/0099605 A1 | 4/2011 | Cha | |
| 2011/0280406 A1* | 11/2011 | Ma et al. | 380/278 |
| 2012/0144196 A1* | 6/2012 | Owen et al. | 713/168 |
| 2013/0212637 A1* | 8/2013 | Guccione et al. | 726/1 |

FOREIGN PATENT DOCUMENTS

| | | |
|---|---|---|
| CN | 101729246 | 6/2010 |
| JP | 2002-312724 | 10/2002 |
| JP | 2005-167589 | 6/2005 |
| WO | WO 2009/001539 | 12/2008 |
| WO | WO 2010/069717 | 6/2010 |
| WO | WO 2010/123890 | 10/2010 |
| WO | WO 2011/047276 | 4/2011 |
| WO | WO 2012/078570 | 6/2012 |

OTHER PUBLICATIONS

GlobalPlatform Card Specification v2.2, Mar. 2006, http://www.globalplatform.org/specificationscard.asp.
Chinese Application No. 201180066662.3: Office Action dated Mar. 4, 20015, 10 pages.

* cited by examiner

SMART CARD WITH DOMAIN-TRUST EVALUATION AND DOMAIN POLICY MANAGEMENT FUNCTIONS

CROSS-REFERENCE TO RELATED APPLICATIONS

This application is the national stage of PCT/US2011/063423, filed Dec. 6, 2011, which claims the benefit of priority to U.S. Provisional Patent Application No. 61/420,162, filed Dec. 6, 2010, the disclosures of which are incorporated herein by reference in their entireties.

BACKGROUND

There are many situations today in which a computing device, which may or may not communicate with other devices or entities, is used in a manner in which the device, or some portion or computing environment within the device, is "owned" by an individual, an organization or some other entity. The term "owned" may indicate that the device, or some portion or computing environment within it, may have been authenticated with an entity and/or the entity may thereafter have taken some form of control over the device or some portion of the device. One example of such a situation is in the wireless mobile communications industry, where a user of a wireless device (e.g., a mobile telephone) may subscribe to the services of a mobile communication network operator.

A problem in many computing contexts today, like the situation described above with mobile communications devices, is that the computing devices may be limited to being "owned" in the entirety of the device by a single entity. And in many cases, the ownership may be established at the time of purchase of a device by a user, preventing business models in which it may be desirable to establish ownership at a later time. Furthermore, these limitations prevent use of the devices in situations in which it may be desirable for multiple ownership of a number of mutually isolated portions of the device to exist, or for ownership to be transitioned to other entities from time to time. For example, in the case of a wireless mobile communication device (e.g., a mobile telephone) users may subscribe to the services of a particular mobile network operator at the time of purchase. Also, it may not be possible for such devices to provide access to multiple operator networks at one time. Updating or changing mobile network and service subscriptions may be difficult, and doing so over-the-air may not be possible.

Also, particularly in the context of wireless mobile communications devices, a computing device may include a Subscriber Identity Module (SIM) or Universal Integrated Circuit Card (UICC) that with which a user may subscribe to the services of a particular network operator. Unfortunately, this SIM/UICC mechanism may be limited to use with a single network operator. Additionally, while a SIM/UICC mechanism is generally considered to be highly secure, the security is not linked strongly to security properties of the whole device on which it resides. This limits the application of scaling security concepts for advanced services and applications such as mobile financial transactions. In particular, these shortcomings are relevant for autonomous devices, such as, machine-to-machine (M2M) communication devices.

SUMMARY

This Summary is provided to introduce various concepts in a simplified form that are further described below in the Detailed Description. This Summary is not intended to identify key features or essential features of the claimed subject matter, nor is it intended to be used to limit the scope of the claimed subject matter.

Systems, methods and instrumentalities are described herein that enable one or more separate domains on one or more devices to be owned or controlled by one or more different local or remote owners, while at the same time providing a level of system-wide management of those domains. According to an exemplary embodiment, these methods and instrumentalities may comprise one or more devices, each of which may comprise one or more domains supported by at least one platform. Each domain may be configured to perform functions for an owner of the domain that may be located locally or remotely from the domain. Each domain may have a different owner, and each owner may specify policies for operation of its domain as well as for operation of its domain in relation to the platform on which the domain resides and in relation to other domains.

One of the domains may be a security domain that may be configured to determine a level of trust between an external stakeholder and the security domain. Additionally, a system-wide domain manager may be resident on one of the domains. The system-wide domain manager may be subsidiary to the security domain. The system-wide domain manager may be configured to enforce the policies on one or more subsidiary domains based on a privilege level received from the security domain. The privilege level may be based on the level of trust between the external stakeholder and the security domain. The system-wide domain manager may enforce policies with a level of autonomy that may be based on the privilege level received from the security domain.

The system-wide domain manager may be configured to enforce its own policies, and may also be configured to enforce a policy of the security domain when the policy of the security domain conflicts with a policy of the system-wide domain manager. The system-wide domain manager may also be configured to enforce the policies of the domain on which it is resident, and it may coordinate how other domains may enforce their respective policies in relation to the domain in which the system-wide domain manager resides. Additionally, the system-wide domain manager may coordinate interaction among the other domains in accordance with their respective policies. The domain on which the system-wide domain manager resides may be owned by the owner of the device that houses the domain. Alternatively, such a domain may be owned by an owner who may not own the device that houses the domain.

A domain application may also be resident on one of the domains. The domain application may be ported to the platform. For example, the domain application may be ported to the platform based on a relationship between at least one owner of a domain and at least one other owner of a domain.

Other features of the system, methods and instrumentalities described herein are provided in the following detailed description and accompanying drawings.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

FIGS. 1A-16 relate to exemplary embodiments in which the disclosed systems, methods and instrumentalities may be implemented. The embodiments described herein are meant to be exemplary and non-limiting. As protocol flows may be illustrated and described herein, the order of the flows may be varied, portions may be omitted, and/or additional flows may be added.

Figure 1A:
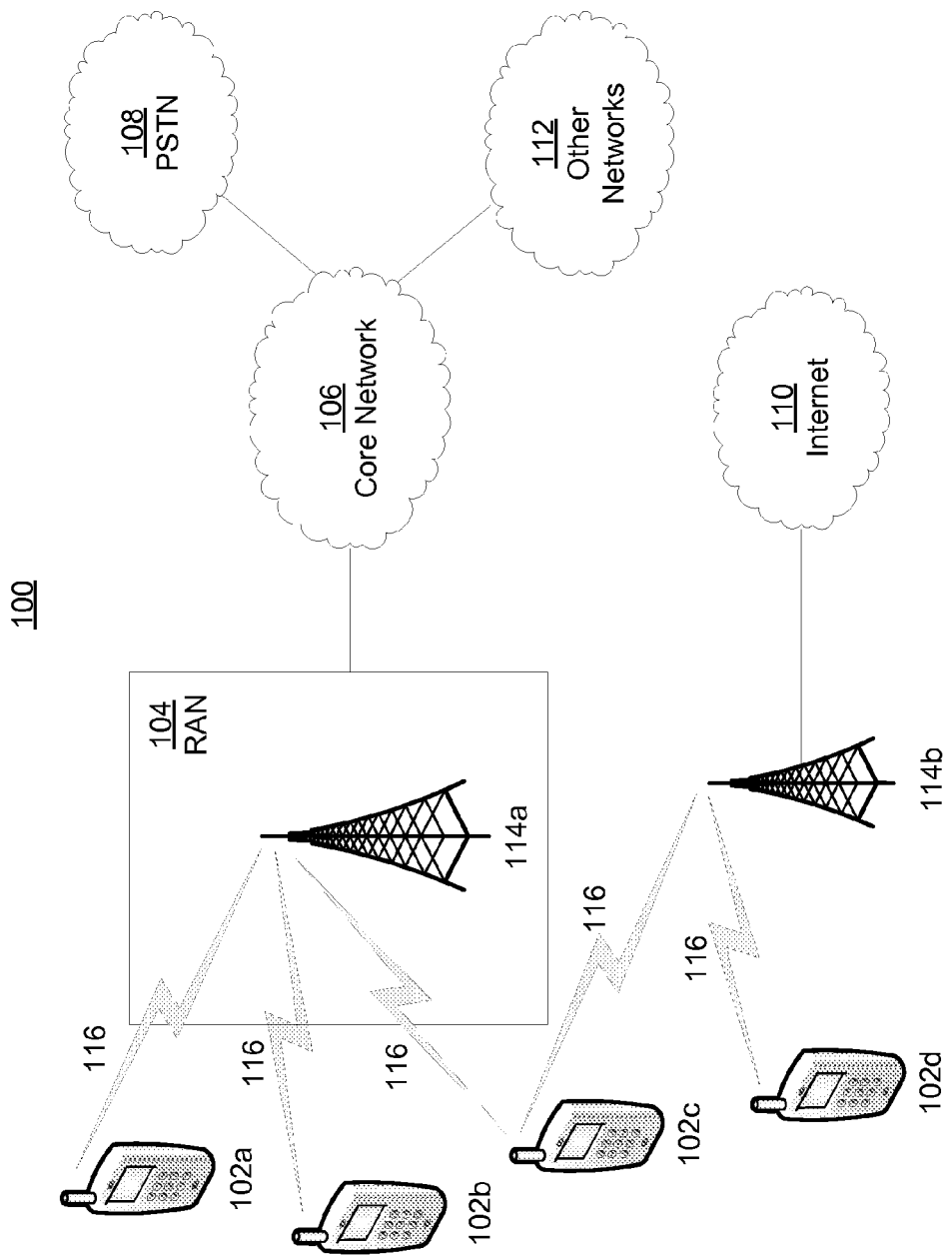
FIG. 1A illustrates an example communications system in which one or more disclosed embodiments may be implemented.
Figure 1B:
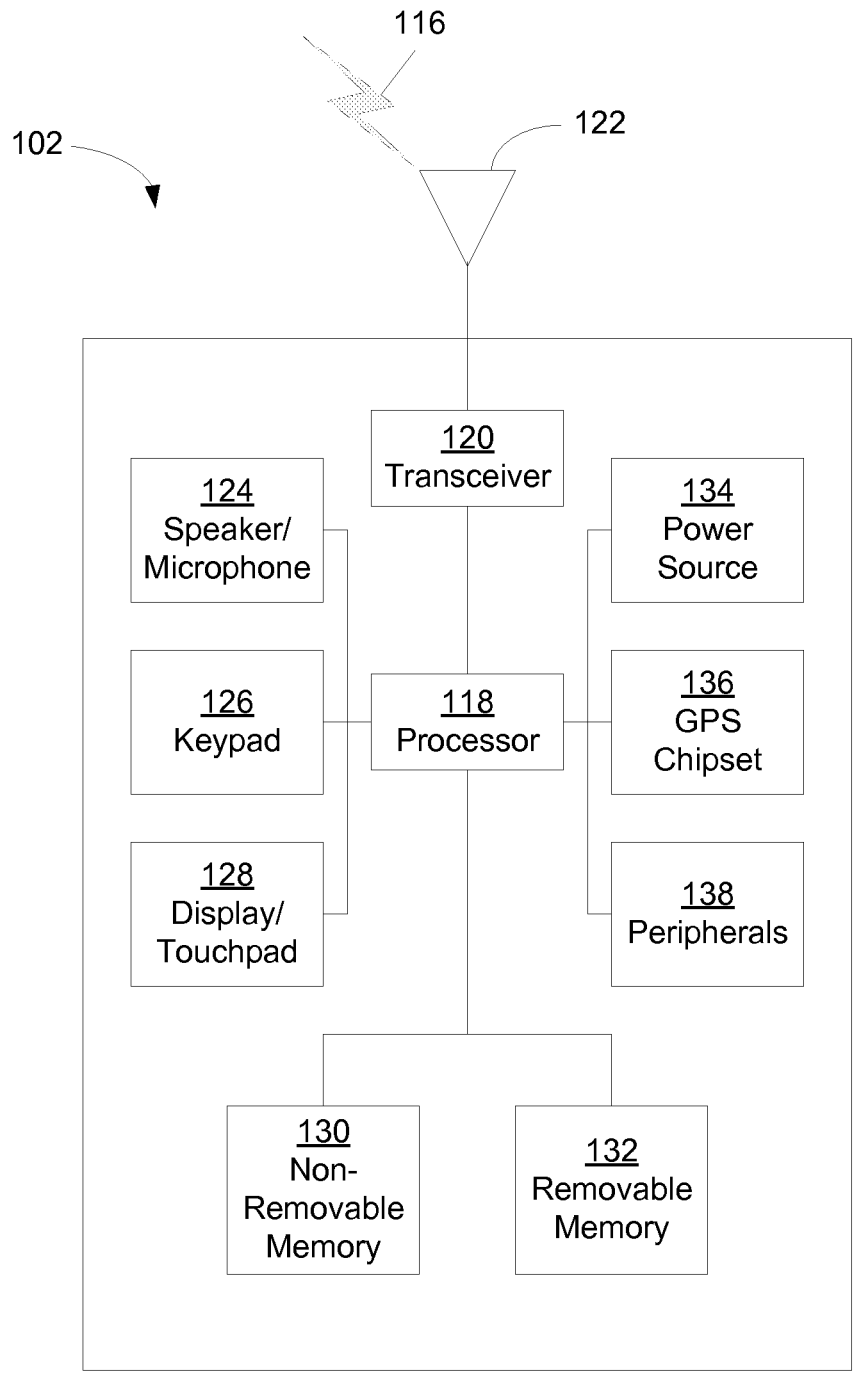
FIG. 1B illustrates an example wireless transmit/receive unit (WTRU) in which one or more disclosed embodiments may be implemented.
Figure 1C:
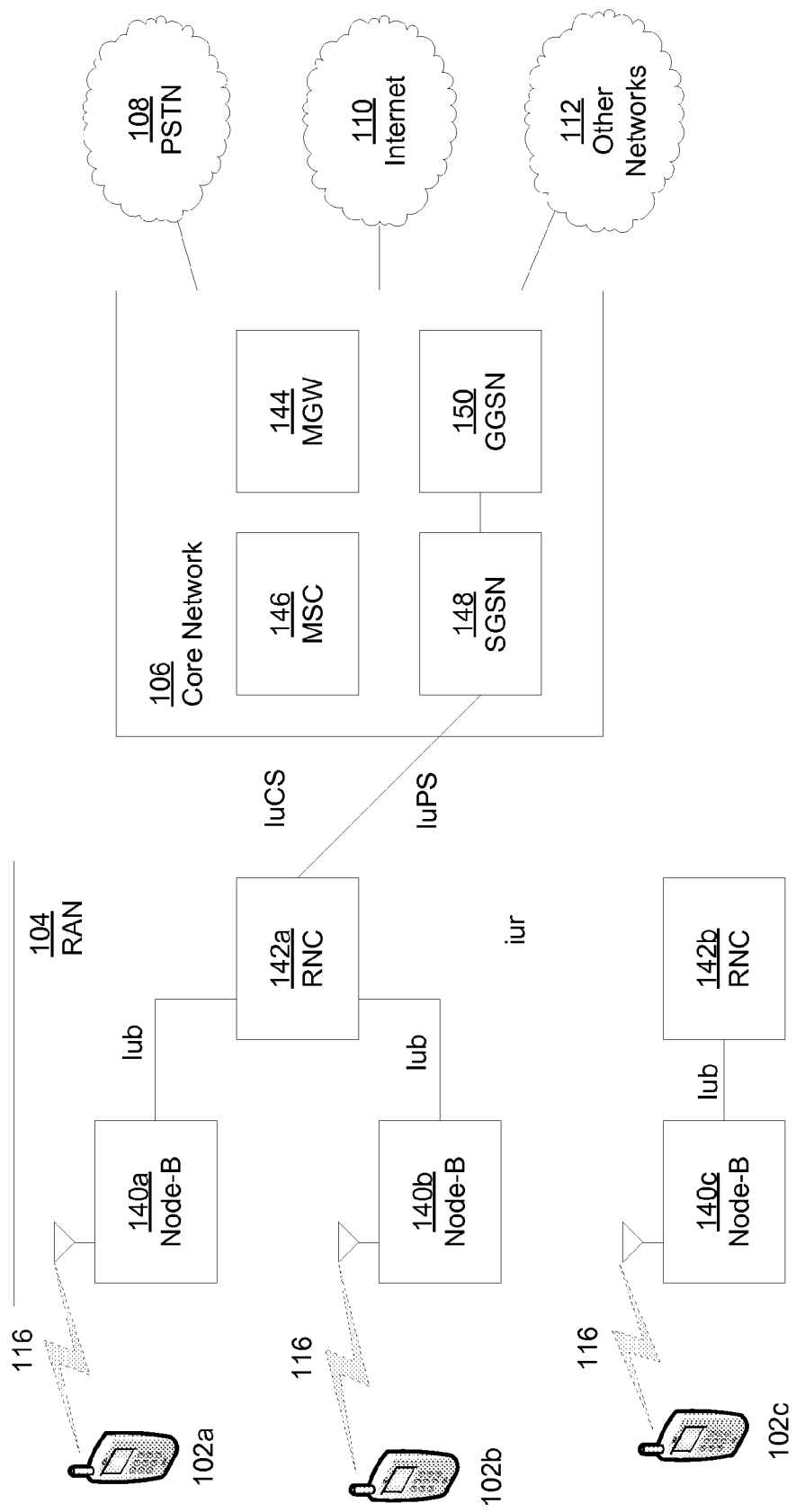
FIG. 1C illustrates an example radio access network in which one or more disclosed embodiments may be implemented.

FIGS. 1A, 1B, and 1C illustrate exemplary communication systems and devices that may be used in the embodiment described herein. FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a tablet, a laptop, a netbook, a personal computer, a wireless sensor, consumer electronics, and/or the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet an embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card/Universal Integrated Circuit Card (UICC), a memory stick, a secure digital (SD) memory card, and the like. The SIM/UICC may provide a wireless device with a secure execution and storage environment from which to execute authentication algorithms and store credentials that enable the device to authenticate the device user's subscription with the network operator toward the network operator and/or allow a network operator to have some form of control, i.e., ownership, over the device. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NIMH), lithium-ion (Li-ion), etc.), solar cells, fuel cells, and/or the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and/or the like.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out and/or support other functionality, such as outer loop power control, load control, admission control, packet scheduling, handover control, macrodiversity, security functions, data encryption, and/or the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

The aforementioned communication systems and/or devices may be used with a Global Platform (GP) smartcard, as described herein. The GP smartcard architecture may provide support for one or more applications on a single device. The accommodation of a large and/or varied number of applications within a relatively open environment may present security challenges, such as attacks from malware, viruses, bots, and/or similar security challenges for example. The security challenges may be constant and/or ever present. The GP security mechanisms may offer protection from security attacks via GP's security domain (SD) structure, which may run under the ultimate supervision of its card manager. The GP security features may include integrity and/or authenticity verification. For example, the integrity and/or authenticity verification may be applied to application code and/or data loaded onto the card, which may be requested by SD security policies for example. Moreover, program behavior may be monitored at the SD and/or manager levels. An application may be transitioned into a "locked" state if a threat associated with that application is detected. However, additions may be made to security and functionality of GP. While embodiments herein may be described with regard to a GP smartcard and/or GP architecture that may be performed on a smartcard, a Subscriber Identity Module (SIM), a Universal Integrated Circuit Card (UICC) or other on-card environment for example, it will be understood that the embodiments described herein may be employed in a variety of off-card environments, such as a virtual Subscriber Identity Module (vSIM) or other platforms with embedded trust environments, for example.

With regard to the GP architecture, the GP operating environment may provide for flexibility regarding an allowed application suite configured on a smartcard. The Trusted Domain (TD) concept may be ported as SAY, from its original setting of a Trusted Hardware Subscriber Module (THSM), to a GP compliant smartcard. According to an embodiment, a GP smartcard may effectively perform features of a THSM. Such features may be performed once certain elements of trusted domain S/W have been loaded and/or installed in an appropriately organized hierarchy. Exemplary features of the TD concepts that may be used include trust mechanisms, remote take ownership (RTO) of TDs, user registration and/or remote credential rollout, trusted subscriber identity management (TSIM) application migration, and full authentication and/or key agreement (AKA) functionality. For example, trusts mechanisms may provide for isolation and security of one or more domains. According to an embodiment, one or more of the domains may comprise a secure execution and storage environment that may be isolated from other domains. The GP trusted framework, or other similar trusted framework for example, may be responsible for inter-application and/or inter-domain communication and may ensure isolation and protection against application contamination, for example, by enforcing the CI's security rules.

For example, trust mechanisms may include runtime integrity checking and/or the roots of trust (RT) associated with mobile trusted module (MTM) trust capabilities. Such aspects of trust may not be employed in the GP environment where safeguards during file loading are performed but where run-time integrity checking may not be allowed. The Remote Take Ownership (RTO) of TDs may provide the remote owner (RO) with the functionality for a complete subscription service. More than one remotely owned TD may exist simultaneously. The TD may be the main functional unit of the TD application, as described herein. The RTO protocol in the THSM environment may incorporate the trust mechanisms for establishing device trustworthiness for the ownership to take place. In a GP setting, however, trust mechanisms may exist in the form of pattern and/or integrity checking during file loading onto the card. The RTO protocol and a more detailed description of TDs are provided herein.

Figure 2:
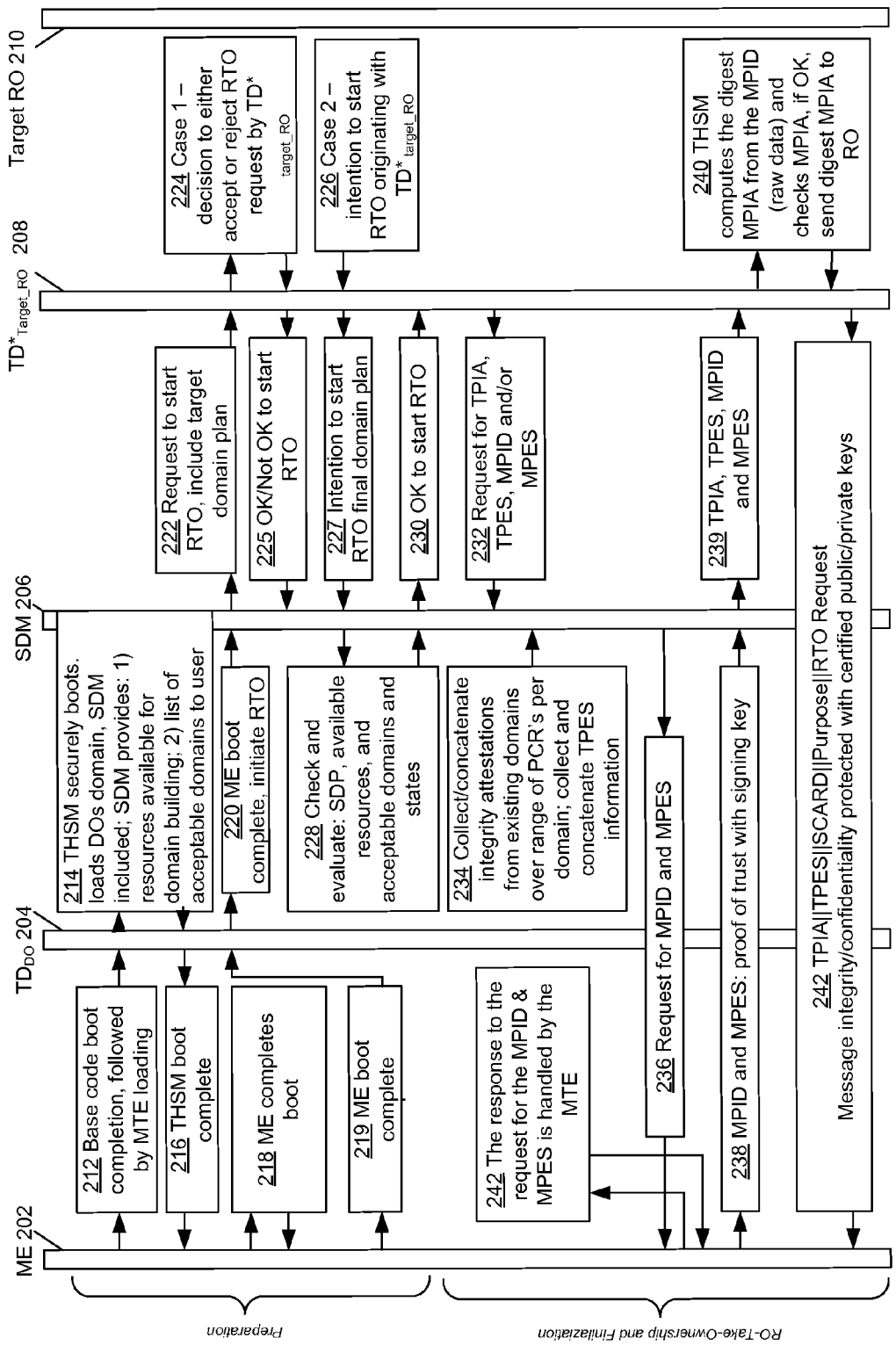
FIGS. 2 and 2A are a diagram illustrating an exemplary embodiment of a process of taking ownership of a domain.
Figure 2A:
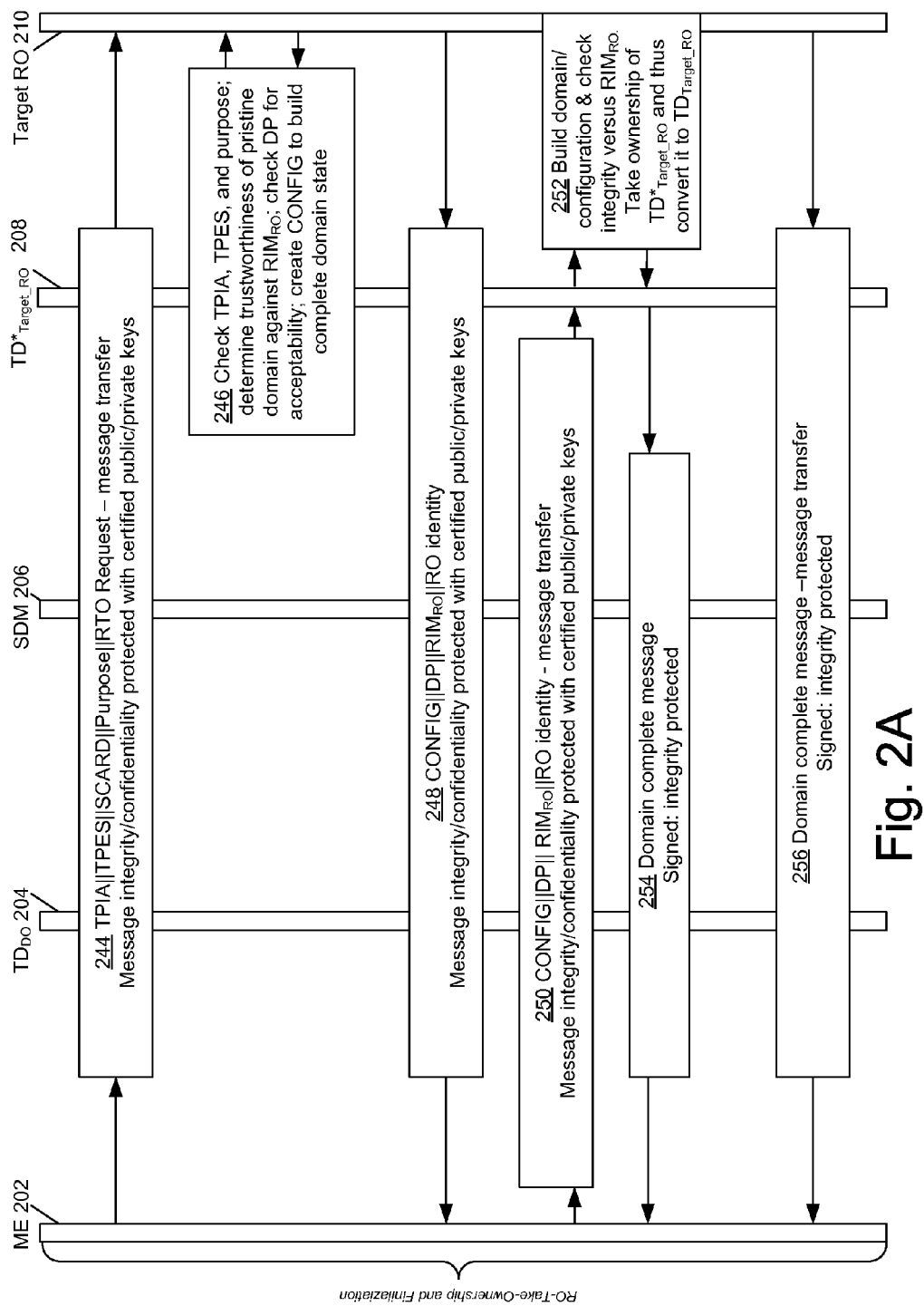

The diagram in FIGS. 2 and 2A illustrates an embodiment of a full RTO protocol flow. FIGS. 2 and 2A illustrate a call flow diagram for an exemplary RTO process. For example, FIGS. 2 and 2A illustrate exemplary calls between one or more of ME 202, $TD_{DO}$ 204, SDM 206, $TD^*_{RO}$ 208 and RO 210. The arrows in FIGS. 2 and 2A may represent the origin/destination of a call. A user may initiate power-on of a UE platform. The platform may provide low-level computing, storage, or communication resources for the domains. The platform may consist of hardware, an operating system, low-level firmware or software (such as boot codes, BIOS, APIs, drivers, middleware, or virtualization software) and/or high-level firmware or software (such as application software) and respective configuration data for such resources. Each domain may comprise a configuration of computing, storage, or communication resources executing on the platform. A base code boot may be completed by ME 202 at 212. At 214, the THSM may securely boot. The THSM may load DO's domain, SDM included; where the SDM may provide: 1) resources available for domain building; and/or 2) a list of acceptable domains to user. At 216, the THSM may complete its boot. At 218, the ME may complete its boot. At 219, the ME may indicate to the $TD_{DO}$ 204 that its boot is complete. During this process the DM's domain may be built, an optional user domain ($ME_U$) may also be built, and/or available resources may be checked. The DM's domain may include the $ME_{TDM}$ which provides the initial configuration and specification of the domain policy for the ME device. By virtue of the pre-configuration of the $ME_{DM}$, this policy may be made to be consistent with that of the SDP in regard to the policies for those domains, such as the ones on the THSM and others on the ME, with common remote owners, between the ME domain and the THSM domain.

Still referring to FIG. 2, the ME 202, with its pre-configured domains, may send a "boot complete" message at 219 that initiates an RTO at 220. This message may comprise explicit information about DM domain policy and available resources in the ME 202. At 222, a request to start RTO, including target domain plan, may be sent from the SDM 206 to the $TD^*_{RO}$ 208. At 224, a decision may be made by $TD^*_{RO}$ 208 to either accept or reject the RTO start request. At 225, a message may be sent from the $TD^*_{RO}$ 208 to the SDM 206 indicating whether the RTO should be started. Alternatively, at 226, an RTO may originate with $TD^*_{RO}$ 208. At 227, $TD^*_{RO}$ 208 may send an indication to the SDM 206 of its intention to start an RTO final domain plan.

The SDM 206 may react to the ME 202 boot message by evaluating the THSM's system-wide domain policy (SDP) and determining what restrictions are to be imposed and/or allocated on the ME 202 domains. These policy restrictions may include what domains, as per their associated remote owners, may be allowable, such as on the ME 202 and the THSM for example. The SDM 206 may determine what system-wide resources the ME 202 is allowed to use for the domains owned by the same remote owner who has domains on the THSM, including those of which it has been made aware of. The SDM 206 may also include the policy restrictions to its base policy and allowable resources to its resource list. After the $ME_{PDM}$ receives the information, then it may exercise certain privileges in terms of making and enforcing decisions regarding management of the resources and domains on the ME 202 without requiring permissions from the SDM 206 for all such decisions. The SDM 206 and its policy (SDP), when viewed as an application within a GP compliant smartcard for example, may be overruled by a security domain such as the CI SD. The SDM 206 may be overruled when it operates with or without autonomy.

Still referring to FIG. 2, the process may continue at 228. At 228, the SDM 206 may check and/or evaluated the following: SDP, available resources, and/or acceptable domains and/or states. At 230, an "OK to start" signal may be sent from SDM 206 to $TD^*_{RO}$ 208. At 232, a request for the THSM Platform Integrity Attestation (TPIA), the THSM Platform Environment Summary (TPES), the ME Platform Integrity Data (MPID) and/or the ME Platform Environment Survey (MPES) may be sent. At 234, SDM 206, for example, may collect/concatenate integrity attestations from existing domains over a range of PCRs per domain, and/or, collect and/or concatenate TPES information.

At 236, a request for the MPID and/or MPES may be sent from SDM 206 to $TD_{DO}$ 204. At 242, the response to the request for the MPID and MPES may be handled by the ME 202. At 238, the MPID and MPES may be sent with a proof of trust, e.g., with a signing key to the SDM 206. At 239, the TPIA, TPES, MPID and/or MPES may be sent from SDM 406 to $TD^*_{RO}$ 208. At 240, the THSM may compute the digest MPIA from the MPID (raw data) and check the MPIA. If acceptable, the digest MPIA may be sent to the Target RO

210. At 242, a request may be sent from TD*$_{RO}$ 208 to ME 202 for TPIA∥TPES∥SCARD∥Purpose∥RTO.

Referring to FIG. 2A, and continuing the RTO process from FIG. 2, at 244, the TPIA∥TPES∥SCARD∥Purpose∥RTO message may be sent from ME 202 to RO 210. At 246, RO 210 may perform one or more of the following: check TPIA, TPES, and purpose; determine trustworthiness of pristine domain against the reference integrity metric RIM$_{RO}$, possibly received from a trusted third party and maintained by the RO; check domain policy (DP) for acceptability; or create CONFIG to build complete domain state. At 248, message CONFIG∥DP∥RIM$_{RO}$∥RO identity may be sent from Target RO 210 to ME 202. At 250, the CONFIG∥DP∥RIM$_{RO}$∥RO message may be transferred from ME 202 to TD*$_{RO}$ 208. At 252, TD*$_{RO}$ 208 may build and/or configure a domain, and/or, check integrity versus RIM$_{RO}$. In addition, TD*$_{RO}$ 208 may have its ownership taken by Target RO 210, thus converting it to TD$_{RO}$. At 254, a domain complete message may be sent from TD$_{RO}$ 208 to ME 202. At 256, the domain complete message, which may be integrity protected (e.g., via a signature), may be transferred from Target RO 210 to ME 202.

User registration and/or remote credential rollout may complete the TD build and/or grant the user full subscriber status. This process may employ user as well as a point-of sale (POS) participation in the protocol. TSIM application migration may include either a complete domain transfer, including TD functionality, or a simple re-imaging of subscriber credentials from one device (e.g., source device) to another similarly capable device (e.g., destination device). For migration, two configuration protocols for the point-to-point transfer of credentials from the source to the destination devices may be considered. One configuration may include one owner for both source and destination devices, while another configuration may include different owners for each device. A GP smartcard may also provide full authentication and/or key agreement (AKA) functionality of each TD once registration and/or credential roll-out in each instance has been executed. This feature may not be used for porting under some circumstances.

Described herein is a comparison of a GP smartcard and the THSM/TD architectures. With regard to the GP smartcard, the GP smartcard architecture may include a card manager. The card manager may be the card central administrator and/or a global platform application programming interface (API). The card manager may be a logical entity comprising the GP Environment (OPEN), a Card issuer (CI) domain, and/or Cardholder Verification Method (CVM) services. The card management structure may include a trusted framework. The trusted framework may be responsible for inter-application communication and/or the global platform registry which may store information such as card resource management data, card and application life cycle information, application identities, process privileges, associated domains, and/ or similar information for example.

The GP architecture structure may be responsible for many of the interactions and/or services on the card, such as inter-application communication, providing API to applications, command dispatch, application selection, logical channel management, card content management, domain personalization services and/or security services, card locking, application life-cycle state update, and/or similar interactions and/ or services on the card for example.

The GP features may provide an operating environment for the card SD structure and/or associated stakeholders. A stakeholder is a trusted computing group (TCG) term, but this term may also be used to refer to similar entities outside of TCG standards. The stakeholders for GP may be the card issuer (CI), the one or more application providers (AP), the device manufacturer, the terminal owner, the controlling authority, and/or other entities that may have an interest or ownership in software and/or hardware on a wireless communication device. The CI may be the effective card owner. The AP may be network operators. For example, the AP may be network operators for WiMax, cellular service, IMS, financial service providers, and/or similar networks. The controlling authority may provide global application services, such as CVM to other card applications, for example. A more detailed description of examples of relevant stakeholders is provided herein.

The card specification may request that each stakeholder's applications possess associated SDs. Each SD may enforce the stakeholder's security policy with respect to the behavior of the application associated with it. The SD structure of the card may be hierarchical with an external stakeholder, such as the CI SD for example, having ultimate control of security policy enforcement. The GP may allow the CI or other external stakeholder to delegate authority of ultimate policy enforcement to a controlling authority or even to an application's associated SD. Various levels of "delegated" authority to non-CI SDs may be permitted in GP. Examples of the levels of delegated authority are identified and discussed herein. While the CI may be used herein to refer to an external stakeholder having ultimate control of security policy enforcement, it will be understood that any other external stakeholder(s) may have ultimate control of the security policy enforcement and perform functions associated with the CI as described herein. Similarly, the CI SD may refer to the SD associated with the CI, but an SD associated with any other external stakeholder(s) having ultimate control of the security policy enforcement may perform the same or similar functions of the CI SD described herein.

Figure 3:
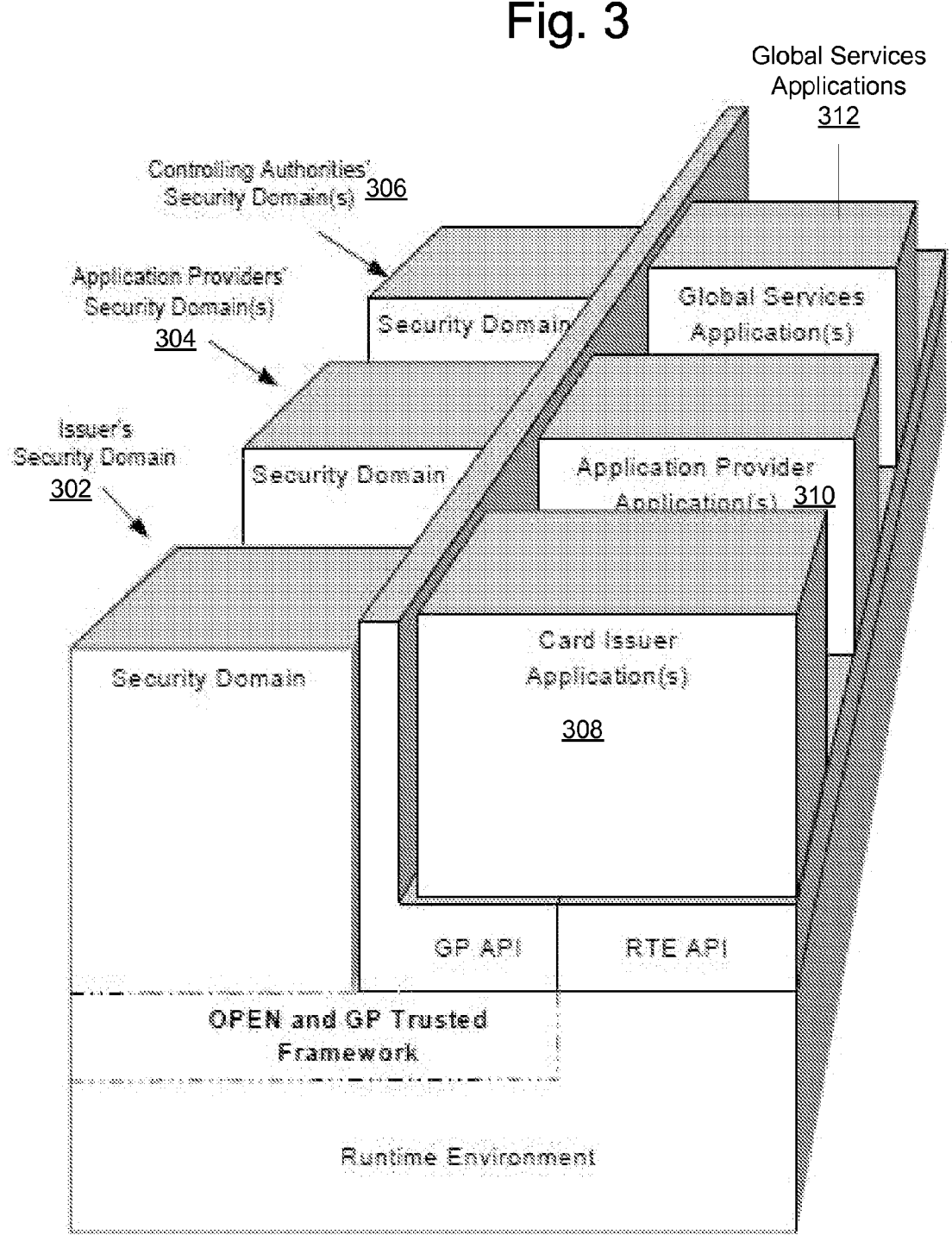
FIG. 3 is a diagram illustrating an exemplary embodiment of the global platform (GP) architecture.

FIG. 3 is a diagram illustrating an exemplary embodiment of GP architecture. As illustrated in FIG. 3, a wireless communications device may include a plurality of applications, each application being associated with a security domain (SD) configured to control policy enforcement on the application. For example, the wireless communication device may include a plurality of applications, such as card issuer application(s) 308, application provider (AP) application(s) 310, and/or global services (GS) application(s) 312. The wireless communications device may also include a plurality of SDs, such as issuer's SD(s) 302, application providers' SD(s) 304, and/or controlling authorities' SD(s) 306. The card issuer application(s) 308 may be associated with the issuer's SD 302, the AP application(s) 310 may be associated with the application providers' SD(s) 304, and/or the GS application(s) 312 may be associated with the controlling authorities' SD(s) 306. Each security domain may control policy enforcement on its associated application(s).

Described herein are the GP platform privileges and security domain management. According to one embodiment, it may be desirable that each functional characteristic described herein be realized while TSIM operates on a GP compliant platform. The extent to which each functional characteristic may be realized while TSIM operates on a GP compliant platform may be determined by how autonomously the TSIM application is allowed to operate with respect to the GP card manager or other external stakeholder for example. The autonomy level may be based on an outcome of a policy agreement between the GP CI and the TSIM AP. The autonomy level may be based on a level of trust between the CI SD and an external stakeholder such as a TSIM AP for example. A level of trust may be based on various criteria. For example, a level of trust may be determined by the level of agreement between the security policy of the security domain which has ultimate control (e.g., the CI SD 302), and the security policy of an external stakeholder (e.g., the AP SD 304 seeking to have one or more applications 310 reside on a smartcard). A trust level may also be determined by how familiar a CI is with an AP. In an embodiment, a level of trust may take into account a recommendation from a third party. The reputation of an AP or other external stakeholder may also help determine a level of trust. Privilege levels may be granted based on the levels of trust. For example, the CI may determine the trustworthiness of the TSIM AP. The CI may grant authorized management privilege (AMP), for example, when the TSIM SDP is deemed to be consistent with that of the CI. Delegated management privilege (DMP), which may provide less autonomy than AMP, may be more likely if the factors used in determining trust levels are less agreeable to the CI. According to an example embodiment, the CI SD 302 may be the highest SD authority for a GP privilege structure, or similar structure as described herein.

At least three privilege levels may be described herein. One such privilege level may be an authorized management privilege (AMP). This privilege level may provide the most autonomy for any application which has been granted such a privilege. If the TSIM application is granted AMP, its SD may be positioned at the top of an SD hierarchy and/or self-associated. In the GP environment, SDs may be considered as applications and may also have associated SDs. If an SD is self-associated it may use its own security services. In this context the CI SD may not control the TSIM SD with token verification (TV) privilege and/or receipt generation (RG) privilege. A self-associated SD may control the TV and/or RG structure within the SD hierarchy and/or may decide not to use tokens. This may give the SD control over the loading of load files.

Another privilege level may be a delegated management privilege (DMP). Although this privilege level is considered strong it may provide less autonomy than that provided by AMP. The application SD may not be self-associated. As a result the CI SD may control load file activities by exercising TV and/or RG privileges over the SD below it in the hierarchy. However, the SD which may be granted DMP may have the authority to perform the loading of load files and/or oversee other security processes, such as those pertaining to file integrity involved with load file activities for example.

Another privilege level may include neither AMP nor DMP. Without either AMP or DMP, an SD may possess very little autonomy. The CI SD may perform the loading functions regarding load files and/or may exercise TV and/or RG privileges in controlling the loading processes. The CI SD may also have control over the load file activities involving file integrity.

Provided herein is a description of GP security domain management, including a description of: 1) receipt issuance mechanisms; 2) token signing mechanisms; 3) delegated management privilege tokens; 4) oversight of receipts by the card management entity OPEN; 5) mechanisms regarding the configuration of supplementary SDs by a self-associated smartcard (SC); 6) self-extradition issues regarding SDs with DMP; 7) overall experience levels with self-extradition in the real world; 8) applications associated with SC web service (SCWS); 9) confidential card management; 10) mechanisms regarding the use of token verification privilege and receipt generation privilege; and 11) further information regarding the configuration of supplementary SDs by a self-associated SC.

GP security domain management properties according to some embodiments are described herein. In an embodiment utilizing GP security mechanisms, a supplementary SD may have token verification privilege and/or receipt generation privilege. In an exemplary embodiment, at least one SD per card may have each of these privileges. The SD may not have to be the same SD which has both the token verification privilege and the receipt generation privilege. Thus, the issuer domain may have the token verification privilege and/or receipt generation privilege, but in other embodiments it may be a different SD which has the token verification privilege and/or receipt generation privilege. For example, according to an embodiment, there may be one SD with receipt generation privilege and one SD with token verification privilege, per hierarchy. This may be different than one SD with receipt generation privilege and one SD with token verification privilege per card. The SD having these privileges does not have to be the same SD but it may be. If OPEN detects that an SD above the current SD in the hierarchy has RG privilege, the receipt may be generated. This may, however, depend on whether a token was used. It may be the SD with RG privilege which may issue the receipt and/or send the receipt to the SD's owner. If the ISD signs the receipt, the receipt may be sent to the CI.

According to an embodiment, TSIM autonomy may exist for issuing load receipts. The TSIM associated SD may be granted authorized management privilege. For example, the CI may grant authorized management privilege to the TSIM associated SD. The CI may grant token verification privilege and/or receipt generation privilege as well. In this configuration, the TSIM may be at the top of its SD hierarchy and may manage the card content of the TSIM application.

In embodiments having GP security management properties, possible token structure methods include token generation/issuance, token verification, and/or receipt generation. For example, embodiments may use a receipt to allow the CI to track the card's configuration. A receipt may be used to let the SD owner, such as the AP and/or CI for example, know that the corresponding token has been successfully used. The SD owner may be established according to which SD signs the receipt. An SD may not track the card's configuration. The GP registry may store the data about the configuration and/or it may be automatically updated after a successful management event. OPEN, for example, may read the GP registry to get information about the configuration. An authorized off-card entity may read the registry using a GET STATUS command, for example. According to an embodiment, a TSIM associated SD may be owned by the TSIM AP. The GP registry may store configuration data when tokens and/or receipts are used. The storage mechanism may be the same if the tokens are issued by the TSIM AP and/or such tokens are verified with signed receipts by the TSIM SD.

In an embodiment using GP security mechanisms, a supplementary SD may verify tokens. DAPs and/or DM tokens may be requested for a supplementary SD with DM privilege to load new applications. This may include loading new child SDs. Tokens of various types may be used to load and/or install an application and/or to move it through its various lifecycle states. DAPs may be generated by the AP. The AP may own the supplementary SD with DM privilege. However, tokens, which may include Delegated Management tokens, may be generated by the CI. This may mean that the supplementary, self-extradited SD with its privileges may get tokens from the CI. The tokens may be supplied to a smartcard in the various INSTALL commands from the AP. The AP may use its DM privilege to load the application. Additionally, there may be one type of token. DAP may also be independent of tokens. Tokens may be signed and/or issued, by the off-card owner of the SD for example, with TV privilege, since that SD may have the key with which to verify the token.

According to an embodiment, there may be one TV privilege per hierarchy. For a card with one tree, the ISD may have TV privilege if SDs with DMP exist. In alternative embodiments, the token issuer may send a signing key to the AP, who may sign the token. This may not affect which SD has TV privilege. If a symmetric signing process is used, then an AP may verify the tokens if it has TV privilege. According to an embodiment, a CI may not give the key away and/or may opt for the split-management with two different hierarchies with its own AM privileges at the root of each hierarchy.

The TSIM AP may share a key with the SD it owns. According to one embodiment, the TSIM AP may share a key if symmetric keys are employed. The AP may issue and/or sign the token. The SD may verify the token signature and/or generate and/or sign the receipt that is sent back to the AP for receipt verification. GP credentials used in this procedure may be different than those associated with TSIM trusted domains.

In some embodiments, the DM token (e.g., or other tokens) may be signed by an external stakeholder other than the CI. For example, the issuer of the token may be the SD provider of the SD with token verification privilege. According to one embodiment, the SD provider may be the CI. The DM token may be signed by someone other than the CI, such as the AP for example. The self-extradited supplementary SD with the right privileges may be independent of the CI. Any SD may have TV privilege. For example, one SD per hierarchy may have TV. It may be the owner of the privileged SD which may sign the token. It may not have to be the Issuer or other external stakeholder having ultimate control of security policy enforcement. For example, an SD in a non-ISD hierarchy may have TV privilege and/or the owner of that SD may be able to sign tokens.

Further, various GP domain hierarchies may be conceived based on the desired type of TSIM configuration. For example, separate remote owners may each have software running as part of their TD functionality. TSIM application may be constructed with corresponding associated GP SDs for each of these remote owners. The SD may be granted delegated management privilege to manage their own configurations with the TSIM associated SD overseeing their activities.

DM tokens are further described herein in accordance with an embodiment. Tokens may be used in various actions and/or privileges. DM token may refer to any token which is used in the DM process of managing card content. DM tokens, as described above, may be used in the context of TSIM application configuration building processes for example.

According to an embodiment, OPEN may determine if a receipt is to be used. OPEN may ensure that a receipt is generated when it may be used, for example, after the relevant command (e.g., INSTALL) has been executed successfully. OPEN may determine if any of the SDs in the hierarchy have receipt issuing privilege. If the current SD, or one above it in the hierarchy, has Receipt Generation privilege, OPEN may ensure that a receipt is generated and/or sent to the Application Provider. Different embodiments of TSIM porting may involve different use combinations of tokens and receipts such as 1) no tokens; 2) tokens with no receipts; and/or 3) tokens and/or receipts with full verification. In one embodiment, if the issuer domain has a receipt issuing privilege, a receipt may be generated for SDs that are associated with the ISD (e.g., not for self-associated SDs). In one embodiment, if the SD loading the application is self-associated and does not have a receipt-generating privilege, a receipt may not be generated by an SD at the top of the hierarchy. Receipts may be optional. For example, if the SD is at the top of the hierarchy, it may be determined which privilege the SD uses to load the application. For example, the SD may have AM privilege, which may mean that it may not use tokens and hence no receipts may be generated. If the SD has RG and/or TV privilege, it may issue receipts for subsidiary SDs. According to an embodiment, the receipts may be issued if they have DM privilege and/or they have a token to perform CCM operations. If an SD has both DM and TV privilege, it may have substantially equivalent autonomy to having AM privilege, since the SD may verify its own tokens.

According to an embodiment, a self-associated SD with DM privileges may create a linear chain of subsidiary SDs and/or a multi-level tree of SDs, under itself. For example, the SD may present the correct tokens which may be verified by the TV privileged SD in the hierarchy. According to an embodiment, at least two levels of SD may exist. For example, one supplementary SD may exist under the Issuer Domain. The self-associated SD may not have any SDs under it. A multi-layer tree may be created. Each SD may know which other SD it is associated to and/or the correct info may be stored in the GP Registry. In an embodiment, a subsidiary SD may be an application and may also have to go through the various card content management processes to get loaded onto the card and/or become operational. A supplementary SD may not have to be self-associated in order to be able to load a subsidiary SD under itself. A supplementary SD may have DM privilege. Even if a supplementary SD does not have DM privilege, the top-level SD may be used to load the SDs under the supplementary SD. A self-associated SD may have to provide its own services, which may be desirable for some APs. The Issuer Domain may kill a self-associated SD and/or its apps. A self-extradited SD may have AM privilege. For example, tokens may not be needed for it to create child SDs. In an embodiment, there may not be an entity above the top-level SD to verify tokens, and, for example, the top-level SD may not have DM privilege. For example, this may relate to TSIM because SDs in the TSIM security domain hierarchy may build their configurations according to the preferences of the remote owner.

In an embodiment, an SD with DM privilege may perform its own self-extradition. According to an embodiment, a token may be used. After self-extradition, the self-associated SD may acquire AM privilege, as described herein. The ISD may grant AM according to an embodiment. The AM may be granted by updating the GP Registry. The owner of the self-associated SD may ask the CI to update the GP Registry. Thus, an SD may not be able to cut itself loose from its parents without permission from the CI. According to an embodiment, an SD may be allowed to self-extradite if it uses an extradition token. According to an embodiment, there may be multiple autonomous SD hierarchies. The SD hierarchies may be within the confines of TSIM. For example, one SD hierarchy may exist for each remote owner.

Similarly, an SD with authorized management privilege may perform its own self-extradition. For example, the SD may be at the top of its own hierarchy. It may not be in the ISD's hierarchy. This may be because the ISD may have AM in that hierarchy. If an existing SD under the ISD is self-extradited by the ISD, then the ISD may go into the GP Registry and/or grant AM privilege to the newly self-associated SD.

In some embodiments, issues related to GP mechanisms for key management may be resolved. For example, an OP-associated-to-SCWS may not be managed and/or owned by the MNO, but may be owned by a 3rd-party OP who installs the OP-associated-to-SCWS into a subsidiary SD. The owner of OP-associated-to-SCWS may use GP commands directly to manage the application. According to an embodiment, direct commands may be used instead of having to go through the SCWS. Direct commands may be used if the OP owner is not the card issuer who owns the SCWS. If both the SCWS and/or OP application are GP apps, the SCWS may invoke the OP application using Trusted Path. The SCWS and/or OP may be under different SDs. For example, the SCWS and/or OP may be under different ownership. The OP application may be provisioned with keys using the GP method and/or an OMA/SCWS method. If the SCWS is not a GP app, (such as a regular Javacard or native app) and/or the OP is a GP app for example, then the OP app may be managed using GP. There may be no functionality in GP to allow the SCWS to invoke, and/or provision keys to, the OP app. In one embodiment, the SCWS and OP applications may exist on the card along with TSIM, but they may function outside of the card.

According to an embodiment, Confidential Card Management (CCM) may allow the loading of encrypted load blocks. The encrypted load blocks may not be decrypted by anyone other than the AP. The AP may load confidential applications over an untrusted transport link. A Link Platform Operator, such as an MNO with a secure OTA system for example, may create an SD, which may be called an APSD, to load and/or manage confidential applications and/or transfer the ownership of the APSD to the AP. The AP may use the SD (e.g., an APSD) to manage confidential loading. The keys used by the APSD may not be known by the LPO. To achieve that, the role of the Controlling Authority may be extended, so that it may secure the key creation for the APSD and/or the APSD personalization. This may be done via the LPO's network using the STORE DATA command. The APSD keys may be generated on-card and/or sent to the remote AP. The APSD may be generated off-card and/or sent to the APSD. Symmetric crypto may be used to sign DM tokens. The CCM may not bypass the mechanisms for card content management. For example, DAPs and/or tokens may still be used. The load tokens may be signed by the Card Issuer. For SD creation and/or assignment, trust may be moved from the CI to the Controlling Authority. According to one embodiment, the CA may hold the AP's public key. The CA may also do an on-card generation of the AP's SD keys. The CA may encrypt the AP's SD keys with AP's public key and/or send them to the AP. Application payloads may be tunneled through the LPO's (e.g., the NO's) network.

An APSD, which may be created by a remote owner and/or may have DM privilege, may configure its executable S/W with the oversight of the TSIM SD at the top of the hierarchy. For example, porting of trusted domain features may be directly dependent on the level of autonomy granted by the CI to the TSIM SD. Some of the above functionalities may be performed under the authority of the CI or other external stakeholder having ultimate control of security policy enforcement. Without total TSIM autonomy, some and/or all of the TSIM features may not be allowed.

According to an embodiment, an SD with token verification privilege (there may be at least one of these per card) may verify the token without having issued the token. For example, the SD may have access to the key used to verify the token. The process of token verification, which may authorize the card to execute the command which contained the token, may be part of OPEN. The AP may obtain the token from the CI. For example, the AP may obtain the token from the CI if it is the CI who issued it. It may be done out-of-band. There may be at least one SD with TV privilege and/or one SD with RG privilege per hierarchy. In one embodiment, the SD with TV privilege may be owned by the off-card entity which signed the token. The SD with RG privilege in that hierarchy may be the one that signs the receipt. The processes of the AP obtaining a token and/or the AP processing the receipt may take place off-card. For example, OPEN may enforce the on-card process of token verification as a pre-condition for executing a card management command for an SD with DM privilege. OPEN may also enforce RG. For example, OPEN may enforce RG if RG privilege is detected in the hierarchy.

According to an embodiment, the enforcement policies of OPEN may not interfere with TSIM activities as long as the TSIM SD (or SDs) which has (or have) authorized management privilege may function with or without token use. TSIM may be used to decide how to configure its SDs in terms of whether SDs have delegated management privilege and whether tokens are used.

In an example embodiment, a self-associated SD with DM privileges may create a group of subsidiary SDs such that the group of SDs are on the same level. For example, an SD with DM privilege may not have to be self-associated to be able to load more SDs under it. However, tokens may be used. As described above, a self-associated SD may not have DMP. The SD at the top of a tree may have AMP. If SDs below the top SD have DMP, the top SD may have TV privilege and/or RG privilege. Each of these privileges may rely on whether receipts are used. A parent, such as a self-associated SD with AMP for example, may create a group of child SDs at the same level as each other. In one embodiment, the parent may not create a group of child SDs at the same level as the parent.

With regard to the THSM, the THSM is a hardware-protected module that may be designed to provide trusted subscription management functions. For example, the THSM functions may include those functions performed as SIM functions for the GSM, the USIM and/or ISIM functions for UMTS and/or IMS operators, respectively, and/or non-3GPP access network subscriptions. The UICC functionality associated with the UMTS environment may be included, for example.

Figure 4:
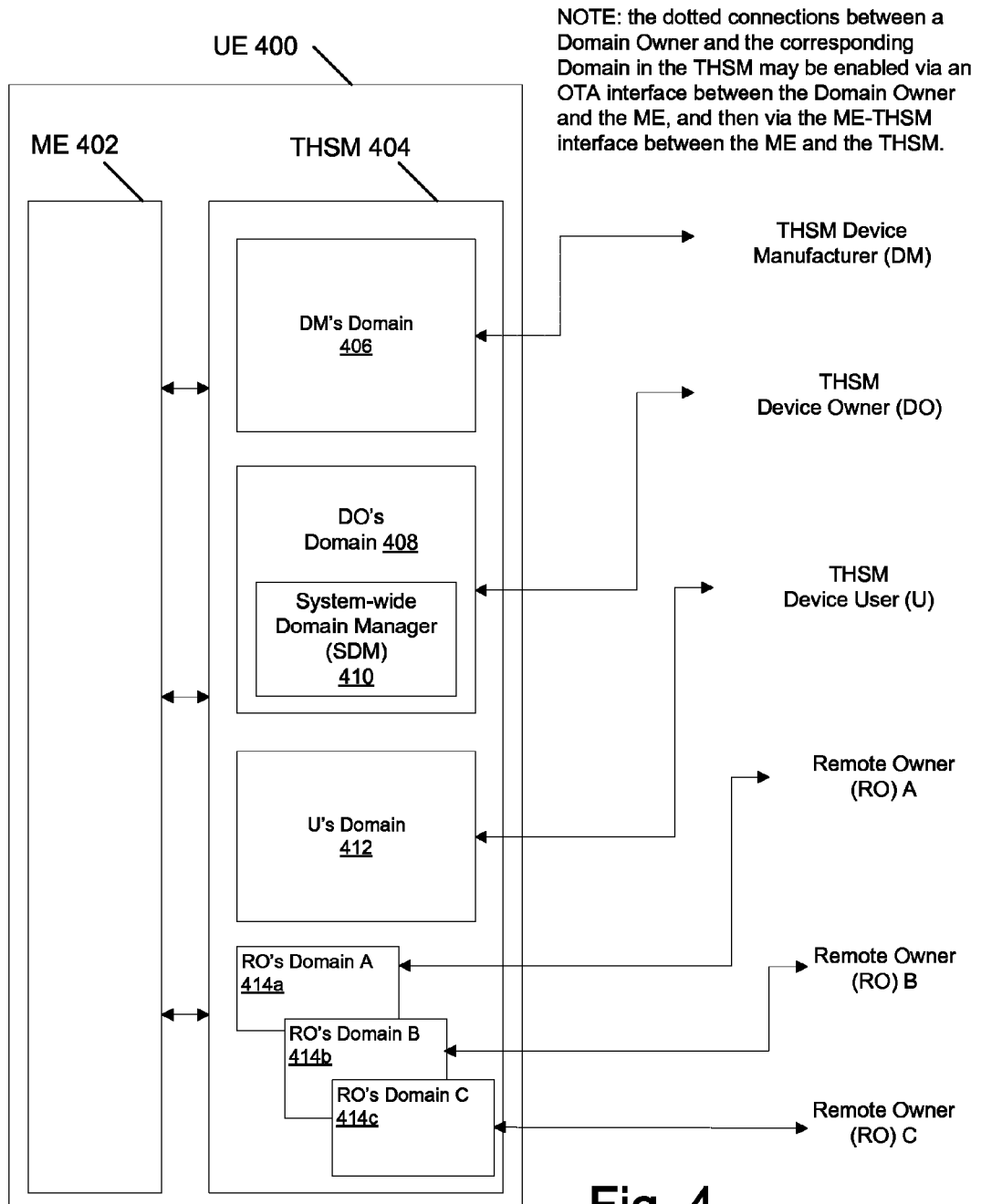
FIG. 4 is a diagram illustrating an exemplary embodiment of the THSM as part of the high-level user equipment (UE) device architecture.

FIG. 4 is a diagram illustrating an embodiment in which the THSM 404 is part of the high-level user equipment (UE) 400 device architecture. The UE 400 may consist of a THSM 404 and an ME 402. The THSM 404 may or may not be embedded on the UE 400. The THSM 404 may be logically separate from the ME 402 even if it is embedded on the UE 400. A THSM 404 may have one or more domains. For example, the THSM 404 may comprise a THSM Device Manufacturer (DM) Domain 406, THSM Device Owner (DO) Domain 408, a THSM Device User (DU or U) Domain 412, a System-Wide Domain Manager (SDM) Domain 410, and/or one or more Remote Owner (RO) Domains 414. Each domain may be owned by a particular owner of the domain and/or may operate for the benefit of the owner by providing secure, trusted services and/or applications. The dotted lines in FIG. 4 indicate the connections between the domain owner and the corresponding domain in THSM 404. According to an embodiment, the connections may be enabled via an over the air (OTA) interface between the domain owner and the ME 402 and via an interface between the ME 402 and the THSM 404. Domains in a THSM 404 may perform security-sensitive functions and/or applications that may not be safe or convenient to perform in the ME 402, which may be considered less secure than the THSM 404 as a storage and/or execution environment. The exemplary implementations described herein may refer to components such as those described in relation to FIG. 4.

Some of the domains may be owned and/or managed by one or more mobile network operators (MNO)s, such as 3G and/or 4G mobile MNOs for example. The domains may be owned and/or managed by other communication network operators, such as WLAN, WiMax, or similar communication network operators and/or application service providers for example. Management of subscription may be a key application that may be supported by domains that are owned by owners. The functionality of subscription management as implemented on a THSM domain is described as a TSIM function. Different domains may support multiple types of functionality. For example, the functionalities may be similar to those provided by the USIM and/or ISIM applications on the UICC on 3G mobile terminals. A THSM may, like a UICC for example, have other functionality and/or applications and data than for TSIM. Further description of the THSM components are described herein. The descriptions are provided for exemplary purposes, without limitation.

Trusted Domains (TDs) are software/firmware entities within the THSM architecture and/or the ME. TDs may provide subscription services, including trusted security functions and/or applications, for the benefit of their owners, which may include remote owners for example. The domains in the subscription module may perform security-sensitive functions and/or applications that may not be safe or convenient to perform in the ME. Domains may be in a "pristine" state with basic functionality before ownership occurs. Domains may achieve full functionality through the ownership process. According to an example embodiment, the owner may be an external stakeholder or other stakeholder as described herein. One owner may take ownership of a TD. One owner may also own more than one TD. The TD application may oversee the structure in which the TDs and/or applications exist. The TDs may be managed by the TD APP S/W and/or policy files SDM and/or SDP and its associated SD. For example, the TDs may be managed from the viewpoint of the TD application.

The Trusted Subscriber Identity Management (TSIM) may perform a similar role in certain TDs as a USIM in UMTS. This may be because the USIM is the subscription application function in UMTS. The TSIM may be a more abstract logical entity than the USIM. The TSIM may provide the subscriber functionality of a USIM in a UMTS environment, such as authentication and/or key agreement for example, but may not be bound to the UICC as is the USIM. Instead the TSIM may exist in an RO's TD(s) in a THSM. A greater generality may be derived from a GP compliant architecture and is described herein. The TSIM is related to, and may also be an extension of, a Virtual Subscriber Identity Module (VSIM).

A Remote Owner (RO) may be a remote stakeholder that gains its ownership status of a TD through a Remote Take-Ownership (RTO) protocol. More than one RO may gain ownership of TDs.

The Device Manufacturer (DM) may be a remote owner. A DM's ownership process may be pre-configured and/or established at UE power up. The trusted domain owned by the DM is denoted $TD_{DM}$.

The Device Owner (DO) may be institutional, such as an IST department at a company for example. The DO may be individual. The DO may be considered local to the UE. The ownership process may be pre-configured and/or take place remotely (RTO). The trusted domain owned by the DO is denoted $TD_{DO}$. The entity owned by the DO may also be the UE, ME, and/or THSM.

The Device User (U) may be the same as, or different than, the DO. More than one user may be supported by the architecture. In the case of institutional ownership, the institution and/or each entity in the institution may function as a user. For example, in the case where an institution comprises multiple employees, the employees may function as users. Users may take ownership through a local take ownership (TO) process. The trusted domain owned by the U is denoted $TD_U$.

A System-wide Domain Manager (SDM) may be responsible for configuring the remotely owned domains, establishing the pristine states of the remotely owned domains, and/or playing a major role in the subsequent states established through RTO for the remotely owned domains. The SDM may employ policy information to drive its processes. The SDM may manage the TSIM system of TDs within a TSIM hierarchy. A SDM may be one suite of applications within a GP environment. When an SDM is in a GP environment, there may be other applications that do not fall under the supervision of the SDM. For example, a TSIM hierarchy as well as other applications on a smartcard may exist in a GP environment by virtue of permission granted by the CI. Privileges may be granted based on levels of trust, and privileges may be granted, by the CI for example, to applications that are allowed to reside on the smartcard.

A System Domain Policy (SDP) may be a pre-configured file which may determine what pristine remotely owned domains are created by the SDM and/or under what conditions RTO for these domains is to take place. The SDP may not be static, as policy changes may be negotiated with the ROs on an individual basis as the need arises. The active policies which govern TSIM processes may ultimately be overseen by the GP card manager.

Identifying and/or defining the roles that various stakeholders play with respect to a device containing a smart card, such as a GP compliant smartcard for example, may aid in determining the flexibility with which a TD application may realize its potential functionality. Described herein are examples of various stakeholders and a description of the roles that those stakeholders may play with respect to a device containing a smartcard. Any one or more of the stakeholders described herein may be an external stakeholder capable of having ultimate control of security policy enforcement on a wireless communications device, however the Card Issuer is generally described herein as the external stakeholder having ultimate control of the security policy enforcement.

A Card Issuer (CI) card issuer may be a person and/or entity which owns the card. The CI may ultimately be responsible for its behavior. The CI SD may be the controller and/or overseer of every application which may be loaded onto the card. However, as indicated herein, application autonomy levels may vary considerably depending on the privileges granted to associated SDs.

A Card Manufacturer (CM) is the manufacturer of the smartcard. The CM may be the producer of the actual hardware consisting of the card components, command interfaces, transaction sequences, and/or similar hardware within the smartcard. The CM as a conceptual entity may be of less importance in implementing the software and/or application features of the smartcard.

A terminal owner may be the person or entity which owns the terminal component part of the device. For example, where the device consists of the integrated card and/or terminal, the owner may be a service provider such as AT&T® or VERIZON®, financial institutions, and/or other service providing entity. According to an exemplary embodiment, the terminal owner may be an enterprise such as an IST department and/or a business that dispenses the device to employees who may be identified as users of the device. The terminal owner may also be an individual user of the device. Two ownership arrangements may be possible. For example, the owners of the card and/or terminal may be the same entity or person or they may be different. Thus, the CI may own the terminal as well as the card.

A device user may be the person or enterprise which uses the device.

An Application Provider (AP) may be any of a potential multitude of entities which may provide and/or install the applications residing on the card. For example, APs may be service providers. For the TD application the AP may be the TD application provider and/or the ROs of TDs. The TD AP may have ownership of the software which controls the TD configuration and/or, to the extent that it has autonomy, the behavior of the TDs within the TD APP. The TD SDM, and/or the TSIM SDP may be the relevant entities as described and/or defined herein. AP and RO may be used interchangeably given that an RO may be an AP.

A Controlling Authority (CA) may have the privilege of keeping control over the Card Content through the mandating of Data Authentication Pattern (DAP) Verification, an integrity checking method. A CA may have the privilege of enforcing the security policy on application code loaded onto the card.

Different assumptions, with respect to the above stakeholder descriptions, may be made. The various stakeholder arrangements may drive card management outcomes. These card management outcomes may affect the way the card applications are allowed to behave. Thus, the level of application autonomy may depend on the described assumptions.

The Global Platform (GP) and TSIM/THSM smartcards may differ in architecture and/or philosophy. The GP may specify the definitions and/or descriptions of the card manager with the GP's main parts, such as the CI SD, OPEN, and/or Cardholder Verification Method (CVM) Services for example. The GP may also specify the definitions and/or descriptions of the card manager using the security domains corresponding to the stakeholders. For example, the GP may specify the definitions and/or descriptions of the card manager with the CISD, OPEN, and CVM Services and the security domains corresponding to the three main stakeholders. These descriptions may cover the life-cycles of security domain and/or non-security domain applications as well as on-card (inter-application) and/or off-card communications, which may include associated security issues. The described security domain characteristics may include domain hierarchical structures and/or the rules governing these structures. However, within the differing architectural frameworks, at least two TSIM/GP commonalities may be discerned. They are given as follows: 1) remote download of applications, functionality, and/or credentials; and/or 2) accommodation of multiple stakeholders. The main stakeholders for GP may be the CI, CA, and/or APs.

Described herein are examples of comparisons in implementations between the THSM/TD relative to GP. According to an embodiment, user participation in the RTO, registration and credential download protocols may differ; use of the point of sale (POS) in the registration and/or credential roll-out process may differ; security aspects of TD which employ integrity checking may differ; the migration protocol, involving one and/or two device owners may differ; and/or the embodiment of TD in which the ME has full MTM capability and may allow for the installation of remotely owned domains on it, and/or on the card, may differ from GP implementations.

As described herein, TD concepts may be embedded into the GP architecture. The realization of TD in the GP environment may consist of TDs and/or their associated GP SDs. Each TD may possess the TD applications which provide the functionality for that domain. Each TD may also have an associated SD which may provide card-level security for the installation and/or subsequent behavior of its applications. In some embodiments, a TD is a separate and distinct entity from an SD.

Figure 5:
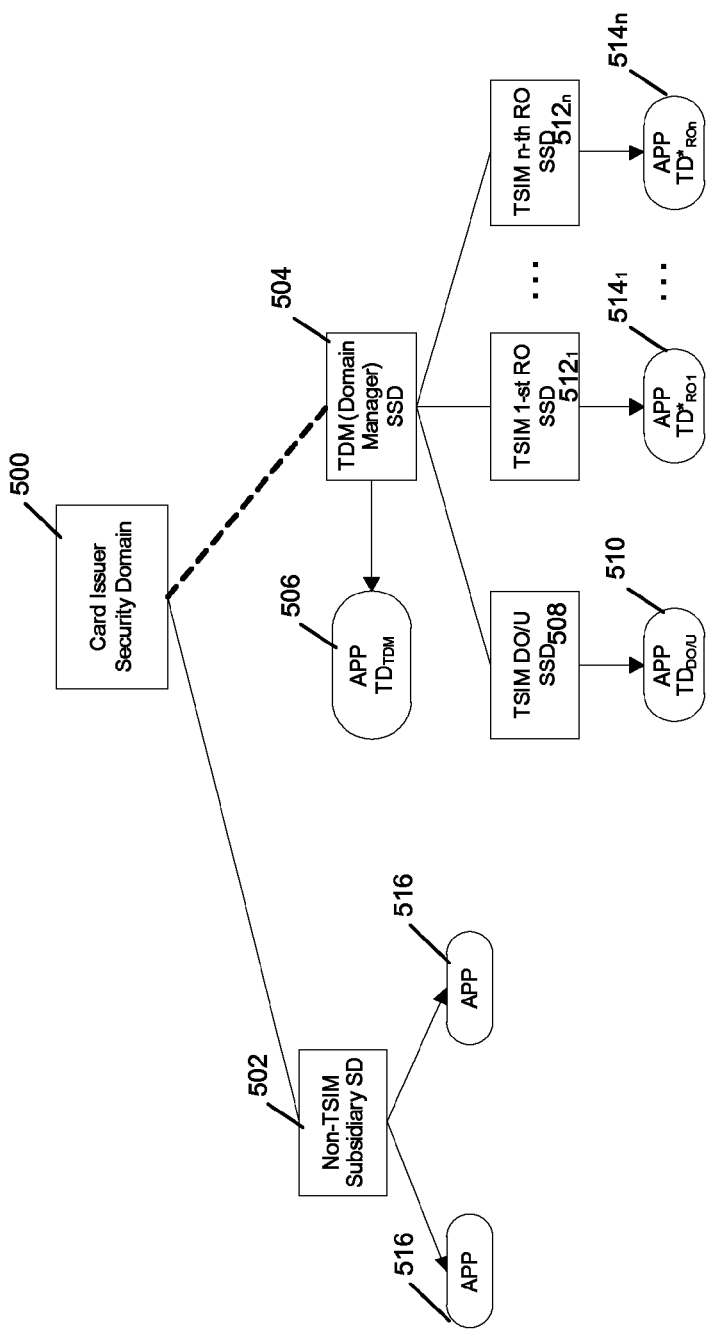
FIG. 5 is a diagram illustrating a GP security domain (SD) hierarchy.

FIG. 5 is an exemplary block diagram illustrating a GP SD hierarchy with two security domains, a non-TSIM associated subsidiary security domain (SSD) 502, and a TD domain manager (TDM) associated SSD 504, both subsidiary to the CI SD 500. The non-TSIM SSD 502 may control applications 516. The TDM SSD 504 may be comprised of an application TD 510 for a device owner (DO) or user (U). The application TD 510 has an associated TSIM SSD 508 which is subsidiary to the TDM SSD 504. A set of pre-RTO application TD*s $514_{1-n}$ whose associated SDs $512_{1-n}$ are subsidiary to the TDM SSD 504 are also shown. For example, if no RTO has taken place, each TD*$514_{1-n}$ is in a pristine state and is yet to be remotely owned. The TDM SSD 504 may be referred to as a domain manager. The TDM SSD 504 functionality may, in effect, replace that of the device manufacturer and/or device owner.

A priori policy agreement between the CI and a TSIM application provider (TSIM-AP) may allow AMP, DMP, or neither AMP nor DMP. The operational mode may be token based. In one embodiment, the CI SD 500 has TV and RG privileges unless the TDM SSD 504 is granted AMP. The CI SD 500 may load the load files of a trusted domain TSIM application provider, for example, when neither AMP nor DMP is granted to the TDM SSD 504. In token based mode, for example, TV and RG for the loading of trusted domain TDM applications, such as APP $TD_{TDM}$ 506, may be performed by the trusted domain application provider. The completed trusted domain may be fully functional (e.g., not pristine) except for possible GP restrictions, and may comprise credentials. If AMP or DMP is allowed in a priori policy agreement, the applications for each pristine TD*s $514_{1-n}$ may be loaded by the TDM SSD 504. Otherwise the applications may be loaded by the CI SD 500. Whether the functionality of the resulting pristine trusted domains is consistent with TSIM preferences may depend on the application loading process.

The trusted domain denoted App $TD_{TDM}$ 506 may contain the application components which manage what may be multiple remotely owned trusted domains whose remote owners may represent various service providers, such as MNOs, banking concerns, or the like for example. The TD manager applications may be comprised, at least in part, of the SDM and/or SDP. They may be the drivers of what is configured in FIG. 5.

Figure 6:
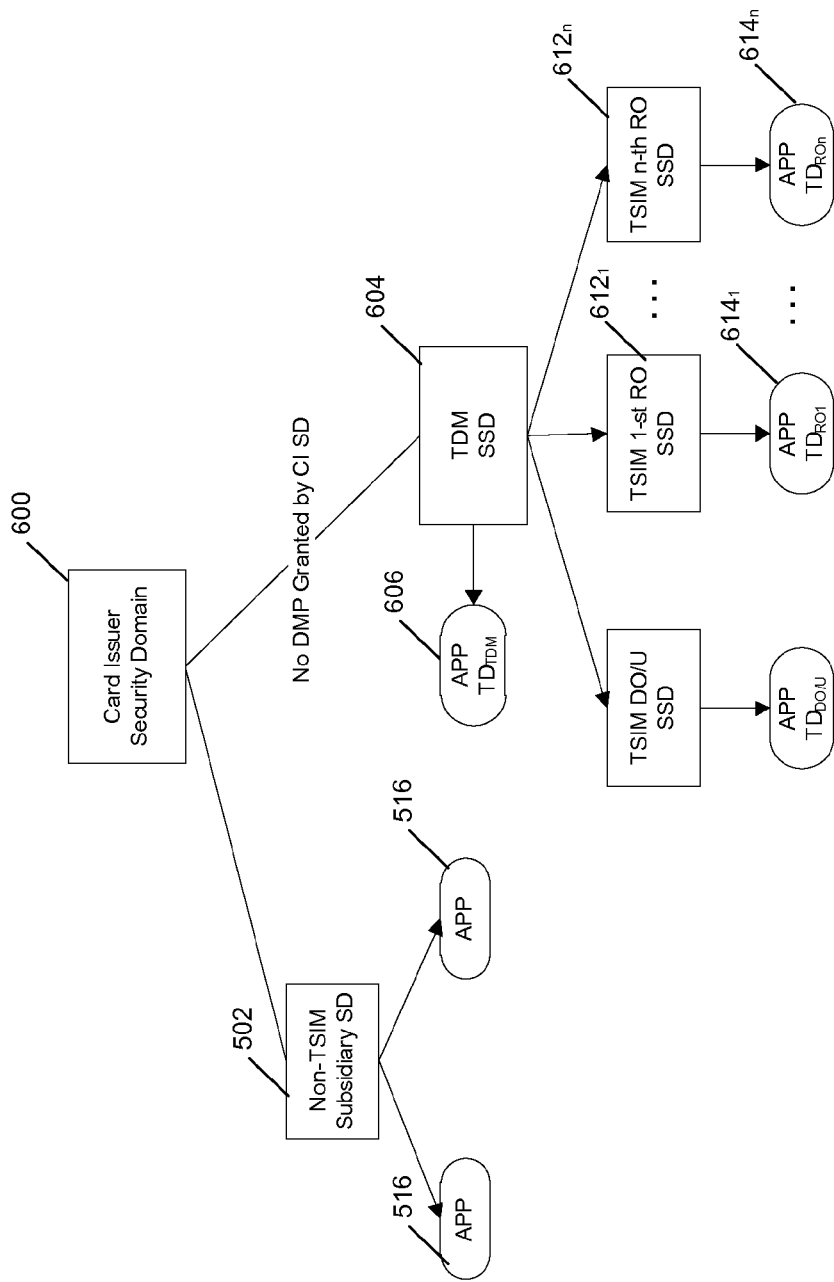
FIG. 6 is a diagram illustrating a configuration of the GP SD structure.
Figure 7:
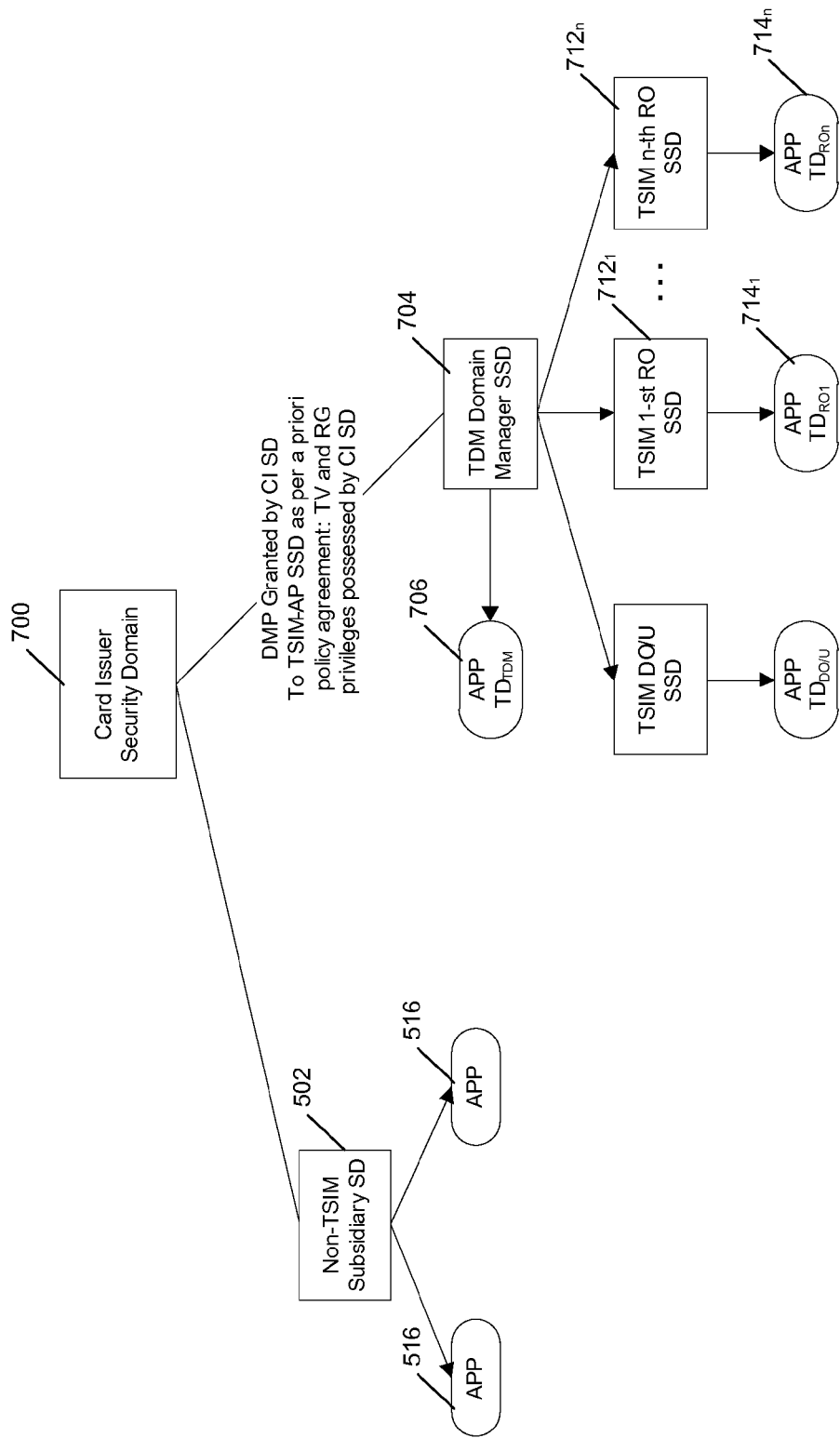
FIG. 7 is a diagram illustrating another configuration of the GP SD structure.
Figure 8:
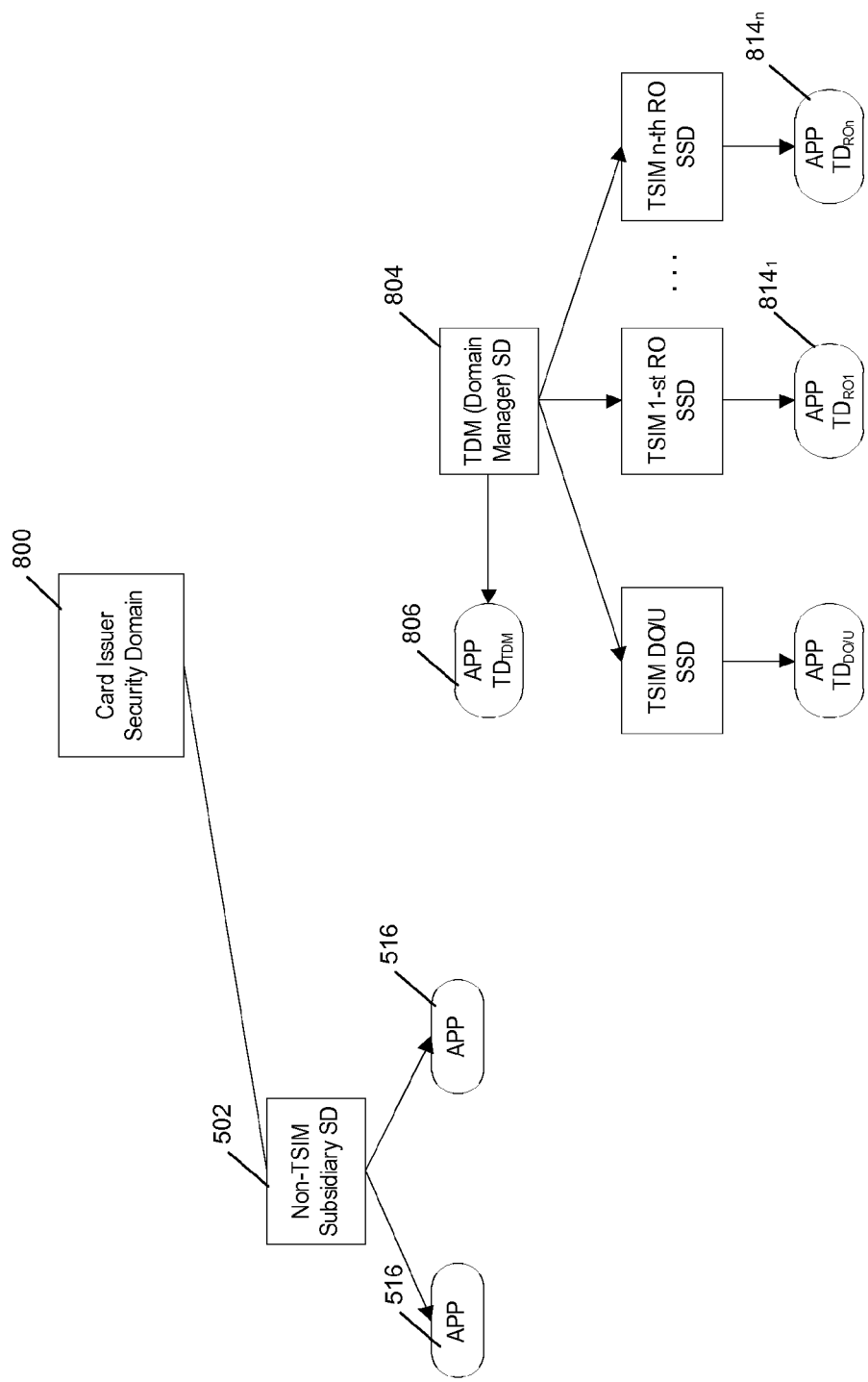
FIG. 8 is a diagram illustrating another configuration of the GP SD structure.

For example, there may be different TSIM configurations on the GP Platform. The exemplary TSIM configurations described herein correspond to the level of autonomy that the GP platform operating environment may allow for the TSIM application and/or any application accommodated by the TSIM application. FIGS. 6, 7, and 8 are diagrams illustrating exemplary configurations of the GP security domain (SD) structure. The TSIM Domain Manager SD may be subsidiary to the CI SD. The TSIM Domain Manager SD may be subsidiary to the non-TSIM application SD. The remotely owned TD SD may be on the same level and/or subsidiary to the domain manager. The privileges granted by the GP card management system may distinguish the TD configurations from each other. The privileges allowed by the CI may be of particular importance in distinguishing the TD configurations. TSIM may be viewed as a set of applications. Each application may provide the functionality realized by each TD.

According to one embodiment, the CI may grant no delegated management privilege (DMP) to the domain manager SD and/or any SD below it in the hierarchy. FIG. 6 is a diagram illustrating a configuration of the GP security domain (SD) structure where the CI SD 600 grants no DMP. In this configuration, the domain manager SD 604 may install associated application software in the TD denoted APP TD$_{TDM}$ 606. The domain manager SD 604 may then have no privilege to load any load files for the subsequent applications to be installed, either as part of the TSIM domain hierarchy in its formation and/or the execution of any of the major TSIM functions, such as RTO, registration, credential roll-out and/ or similar TSIM functions for example. The CI SD 600 may control loading operations and/or the operation for token use. For example, the CI SD 600 may load the load files for each TD according to system domain policy. Operational modes may be simple (e.g., no tokens) or token based, with the CI SD 600 having TV and RG privileges. The CI SD 600 may also handle the integrity checking, referred to as Data Authentication Pattern (DAP) Verification in GP, of application code.

As illustrated in FIG. 6, the trusted domains TDs 614$_{1-n}$ TD$_{RO}$ are un-starred because it may be assumed that RTO has taken place in each instance. The RTO in this instance may be restricted by CI SD 600 policies, and the level to which each RO would have control of its TD may be determined by such policies and minimally by the TSIM domain manager SDM mechanisms. For example, each TD 614$_{1-n}$ may be formed via an RTO protocol controlled by the CI SD 600, and thus the resulting trusted domains may have limited TSIM functionality. The set of pre-RTO application TDs 614$_{1-n}$ each may have associated SSDs 612$_{1-n}$. In a token based mode, token verification and receipt generation for the loading of the applications for each TD 614$_{1-n}$ may be performed by the corresponding remote owner. For the domain manager TD 606, TV and RG may be performed by the TSIM application provider.

According to another embodiment, the CI may grant DMP to the domain manager SD. FIG. 7 is a diagram illustrating an exemplary configuration of the GP security domain (SD) structure where the CI SD 700 grants DMP, for example, as per a priori policy agreement. The CI SD 700 may possess TV and RG privileges. In this instance, the TD domain manager SD 704 may choose to load its own load files. The TSIM domain manager SD may choose to load its own load files where token management, or token verification (TV), and/or receipt generation (RG), may be handled by the CI SD 700. DAP verification may also be the responsibility of the issuer SD 700.

In an embodiment in which the TD domain manager SD 704 is granted DMP, the domain manager SD 704 may have more autonomy to determine the level to which the post-RTO functionality resembles consistencies with the TSIM operating environment. For example, the off-card TSIM AP may generate a token to initiate the load process. The load process may continue when the token is verified by the CI SD 700. The load process may complete with receipt generation by the CI and/or receipt verification by the AP. The TV and/or RG procedure may assume that a key structure for signing and/or verification exists between the CI SD 700 and/or the AP. In a token based mode, token verification and receipt generation for the loading of the applications for each TD 714$_{1-n}$ may be performed by the corresponding remote owner. Each TD 714$_{1-n}$ may have a corresponding TSIM SSD 712$_{1-n}$ that may be subsidiary to TDM SSD 704. For the domain manager TD 706, TV and RG may be performed by the TSIM application provider, as described herein.

According to another embodiment, the domain manager SD may be granted full Authorized Management (AM) Privilege by the issuer SD for an exemplary configuration. FIG. 8 is a diagram illustrating exemplary TD domain manager SD 804 being granted full Authorized Management (AM) Privilege by the issuer SD 800. The AMP grant may yield full autonomy to the TSIM application. The TSIM application may load the load files without management control from the issuer SD 800. Thus, the TSIM application may perform code installation with or without tokens. The TSIM application may be responsible for DAP verification activities. The TD domain manager SD 804 may also have TV and RG privileges. In a token based mode, token verification and receipt generation for the loading of the applications for each TD 814$_{1-n}$ may be performed by the corresponding remote owner. For the domain manager TD 806, TV and RG may be performed by the TSIM application provider.

Although it may be assumed that full TSIM functionality may be realized with this level of autonomy for the TSIM application, the card manager, specifically OPEN (Global Platform Environment), whose responsibilities may include providing installed applications an API, command dispatch, and/or card content management, may oversee the application behavior. For example, OPEN may oversee an RTO protocol that forms each TD 814$_{1-n}$ and is controlled by the TD domain manager SD 804. Each TD 814$_{1-n}$ may possess almost all or all of the TSIM functionality. If certain security policies are violated, an application may be placed in a LOCKED stated and/or prevented from executing. These controls may apply, as well, for the configurations described relative to FIGS. 6 and 7, as they may be operating under more constraints. The global platform rules for control of application behavior are described in greater detail herein.

As described herein, the TD may be built on the GP platform. The TSIM application, by virtue of its dynamic nature, may build itself over time. The TSIM application may be described as being evolutionary. A mechanism that may be used for the initiation of this evolutionary process may be a configuration file. The configuration file may lay the structural groundwork for TSIM. The configuration file may be responsible for the formation of the domain manager trusted domain (TD$_{TDM}$), given that it may be resident on the card. Other domains, such as the device owner trusted domain (TD$_{DO}$) and/or the user's trusted domain (TD$_U$), may be installed as well. However, a trusted domain installation process may be different on a GP compliant card as compared to the THSM environment. The TD$_{TDM}$ may be loaded with the permission of the card issuer SD. Although a configuration file may be used to configure the TD$_{TDM}$, it may not be installed at manufacture time. This file may be part of the DM load file and/or may be activated by OPEN to configure and/or install code for the given trusted domain.

The above-described configurations may have the TSIM controls centered in the SD associated to the domain manager trusted domain TD$_{TDM}$, whereas in the actual implementation of the TD application the policy controls may reside with the SDM, which may be an application in the TD$_{DO}$. The SD hierarchies described above may be implemented using a similar TSIM policy manager that is resident in the TD$_{TDM}$.

According to some embodiments, the trusted domain application may be ported to a GP environment. At the highest level, the TD concept may be ported into the GP environment as a separate set of applications on a GP compliant smartcard. The SD ownership relationships by certain stakeholders may have an impact on the porting restrictions of TD to GP. For example, it may be favorable for robust porting to GP if the TD AP and the CI are the same, and it may be less favorable if the TD AP and CI are different. Several use cases may be considered for this porting process. The impact on the porting process is described in further detail herein.

According to an embodiment, the porting process may allow for maximum autonomy for the TD application as it evolves. The use in which the CI and/or the TD AP may be the same may be the most amenable to the allowed autonomy.

A trusted domain manager (TDM) security domain (SD) may be created. As described herein, the TDM SD may be configured according to various states, such as an INSTALLED state, a SELECTABLE state, a PERSONALIZED state, and/or a LOCKED state. The trusted domain manager's security domain (TDM SD) corresponding to the TDM application ($TD_{TDM}$) and/or owned by the TD AP may be PERSONALIZED on the GP smartcard before applications running under the TDM's direction may be created and/or associated with it and/or associated with their other subsidiary security domains. According to an embodiment, the TD AP may request that the TDM SD be INSTALLED and/or entered into the Global Platform Registry by the CI. Next, the domain may be transitioned into the SELECTABLE state so that it may receive personalization commands from off-card entities and/or transition into the PERSONALIZED state. In the PERSONALIZED state, the SD may have the keying information for proper functioning in the GP environment.

Figure 9:
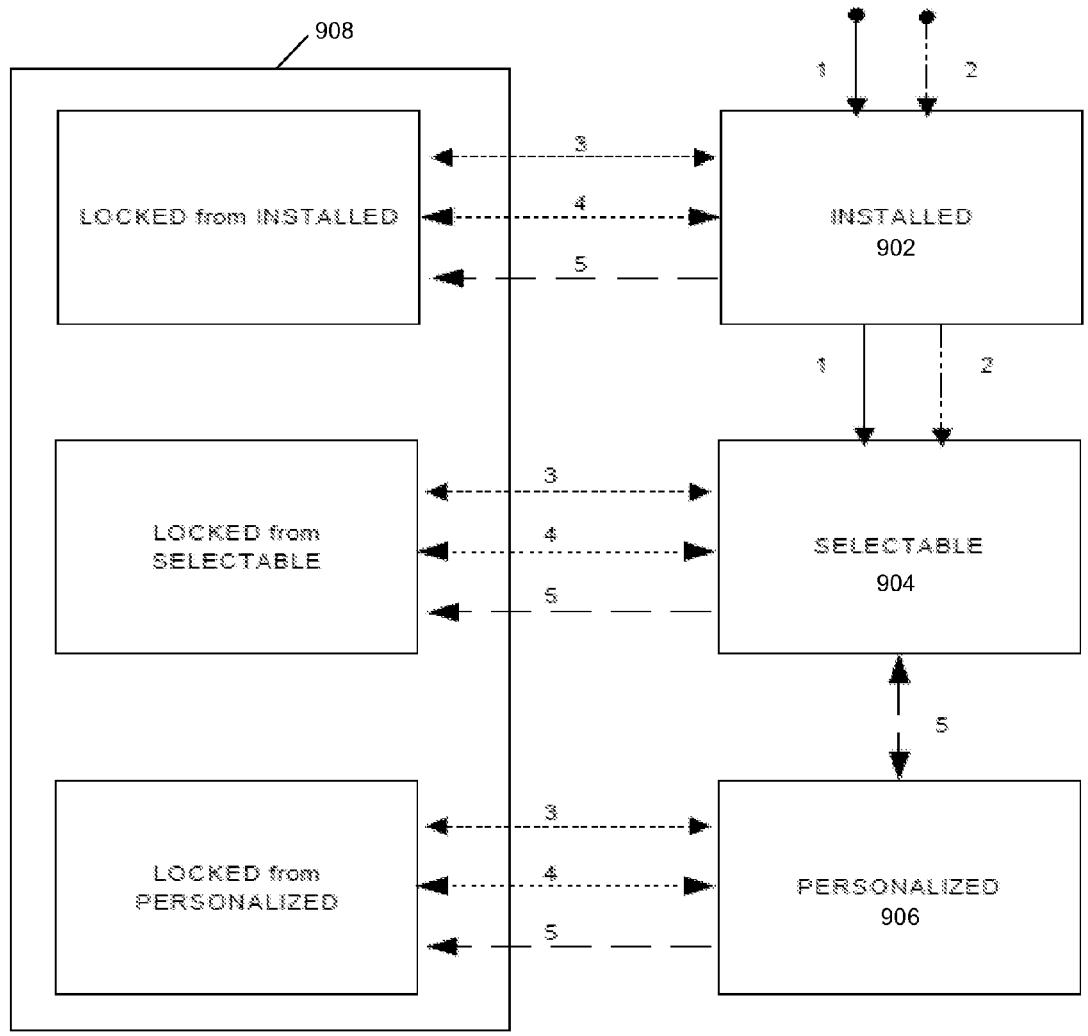
FIG. 9 is a diagram illustrating the SD states and their transition mechanisms in a general GP setting.

The life cycle states for security domains may be uniform, regardless of their positions in any SD hierarchy. FIG. 9 is a diagram illustrating exemplary SD states INSTALLED 902, SELECTABLE 904, PERSONALIZED 906, and LOCKED 908. FIG. 9 also shows transition mechanisms in a general GP setting. In the case of the TDM SD, the CI SD may be the security domain with the privilege to install, (e.g., into the INSTALLED state 902), and/or transition the SD to the SELECTABLE state 904 where it may receive GP commands from off-card or external entities with the appropriate access privilege. One such off-card entity may be the SD's AP for example. Once the transition process has been initiated by the SD itself, the AP may follow up by generating and/or loading the personalization data and/or security keys as the means by which the PERSONALIZED state 906 is entered. The DM SD may be transitioned into the LOCKED state 908 by CI SD, the TDM SD itself, and/or another external stakeholder SD for example. The LOCKED state 908 may be used as a control on security. For example, the LOCKED state 908 may be used as a control on security in the event that a threat associated with a SD is detected within the card. Threat detection may be overseen by OPEN.

Figure 10:
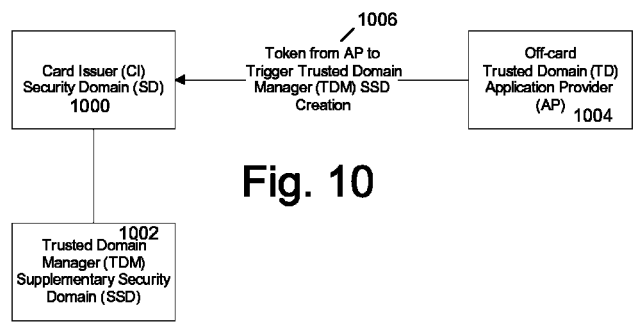
FIGS. 10, 10A, and 10B are diagrams illustrating messaging details and annotations specific to the life cycle states of the TDM SD.
Figure 10A:
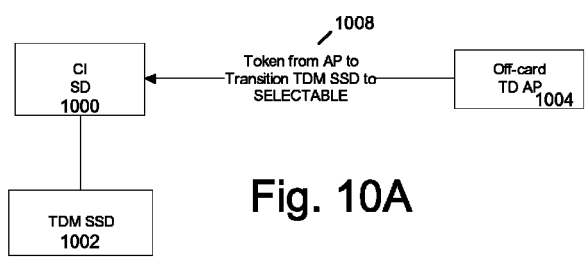
Figure 10B:
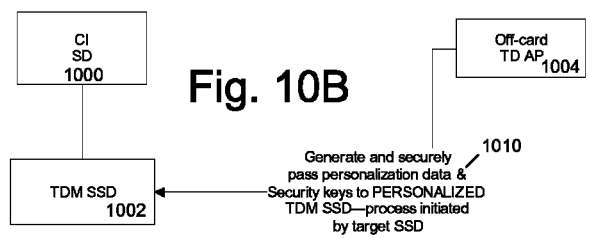

FIGS. 10, 10A, and 10B illustrate exemplary messaging details that may correspond to the life cycle states of the TDM SD. The life cycle structure may mirror that illustrated in FIG. 9. For example, token usage may be assumed to be a policy request of the CI SD 1000 in FIG. 10. The off-card TD AP 1004 may provide signed tokens at 1006. The tokens may be verified for the process to move forward. When communicating with the CI SD 1000, tokens may be used. When communicating with supplementary SDs such as TDM supplemental security domain (SSD) 1002 with AMP, tokens may not be used where not requested.

The TD AP 1004 and/or the CI SD 1000 may arrange for a key structure to be in place before the illustrated protocol steps take place. The TDM SD is shown as TDM SSD 1002 in FIGS. 10-10B because the security domain may be supplementary to the CI SD 1000. Each step of FIG. 10 may transition the TDM SD to the next state.

For example, the TD AP 1004 may request the creation of the TDM SSD 1002. Based on the request, the CI SD 1000 may verify the token from the TD AP 1004 and create the TDM SSD 1002. The TDM SSD 1002 may now be INSTALLED and may have an entry in the GP registry. The TDM SSD 1002 may provide the security services in GP to perform subsequent application installation and/or the creation of other SDs for certain applications.

FIG. 10A illustrates how, according to one embodiment, a command 1008 may come from the TD AP 1004 to transition the TDM SSD 1002 to a SELECTABLE state. The command 1008 may comprise a token to transition TDM SSD 1002. The CI SD 1000 may verify the token and transition the TDM SSD 1002 to the SELECTABLE state. Once in the SELECTABLE state, the TDM SSD 1002 may process personalized commands from authorized off-card entities, such as the TD AP 1004 for example.

In accordance with an embodiment, FIG. 10B shows how the TDM SSD 1002 may transition to a PERSONALIZED state. For example, the CI SD 1000 and the off-card TD AP 1004 may negotiate security policy. Security standards may also be determined by the CI SD 1000. The TDM SSD 1002 may transition itself to a PERSONALIZED state. Personalization data and/or security keys may be remotely loaded at 1010, making the TDM SSD 1002 fully functional for the installation of TD S/W modules and/or supporting files. The loading process may be initiated by the TDM SSD 1002. The security features of the TDM SSD may available to associated applications. Although tokens may be requested by the CI SD 1000, the commands may be delivered to the TDM SSD 1002.

Following the installation, selection, and/or personalization of the TDM SSD 1002, the TD application trusted domains may be loaded and/or installed. This process may conform to the life-cycle structure of GP compliant cards.

Figure 11:
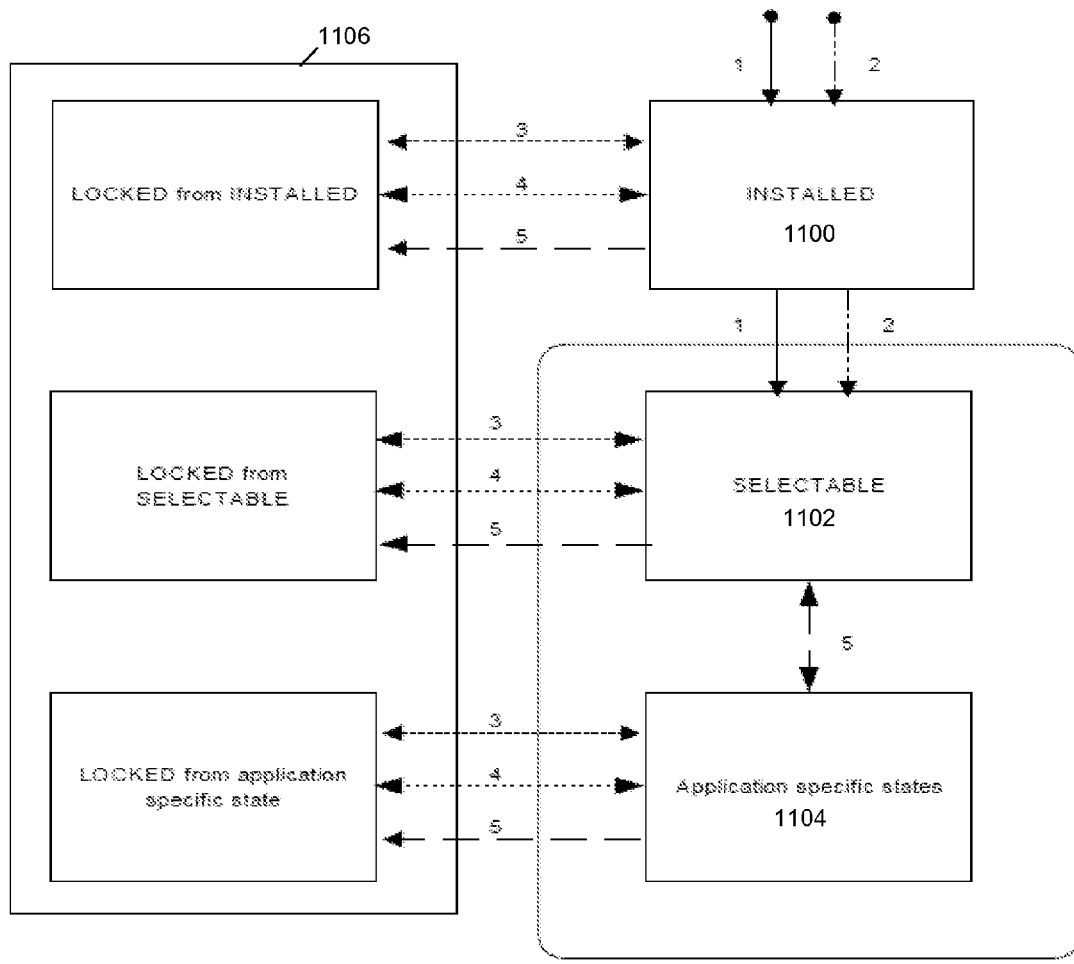
FIG. 11 is a diagram illustrating the various states that an application may acquire in GP.

FIG. 11 is a diagram illustrating the various states that an application loaded onto the card may acquire, such as in GP for example. The mode of transfer from state-to-state, and/or outside the specific states, may depend on the privilege in some cases. For example, SDs with AM privilege and/or DMP may transition an application from INSTALLED 1100 to SELECTABLE 1102. However, whether or not the DM SD has AM privilege, DMP, or neither, the application may, on its own, transition into specific states that may be peculiar to it. These specific states are illustrated in FIG. 11 as application specific states 1104. Some of the transitions may be irreversible. For example, the transition from a loaded state to an installed state 1100 and/or from an installed state 1100 to a selectable state 1102 may be irreversible. Some of the transitions may reversible. For example, any state to the locked state 1106 may be reversible, and the selected state 1102 to application specific states 1104 may be reversible.

Figure 12:
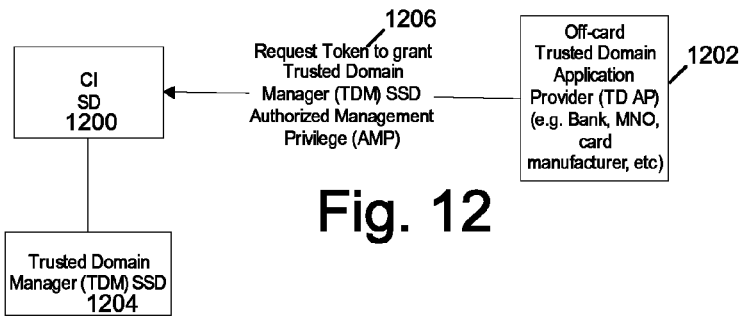
FIGS. 12, 12A, and 12B show a diagram illustrating a progression regarding the installation of pre-RTO trusted domains.
Figure 12A:
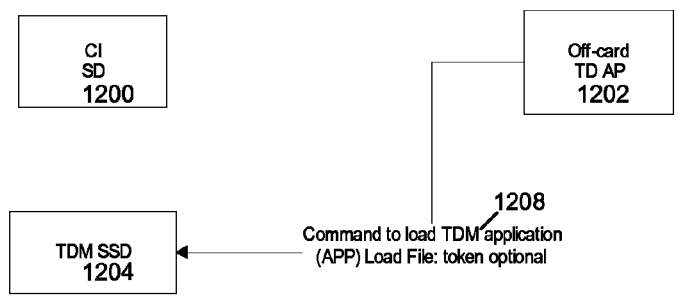
Figure 12B:
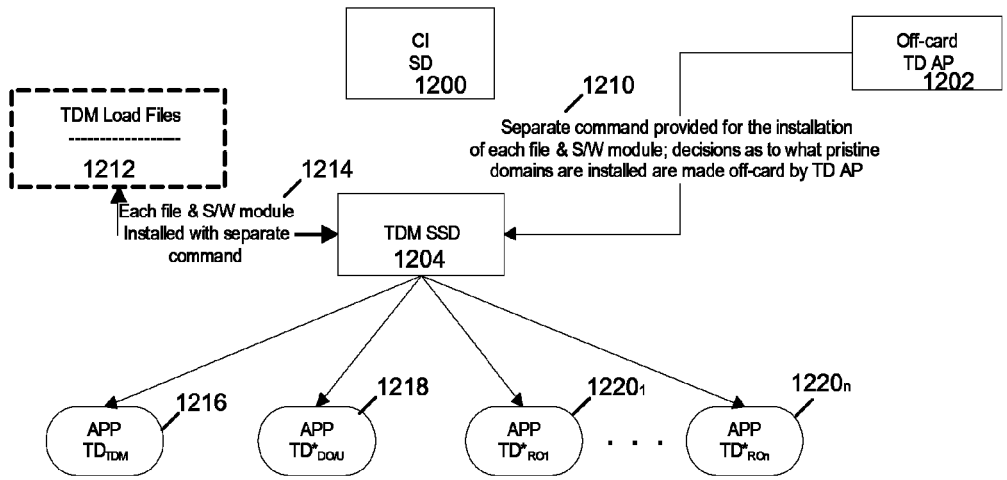

FIGS. 12, 12A, and 12B illustrate an exemplary progression regarding the installation of pre-RTO trusted domains, such as the domain manager TD ($TD_{TDM}$), the device owner or user TD ($TD_{DO/U}$), and the generic remotely owned domains ($TD_{RO}$). This installation may assume that TDM SSD 1204 may be granted AMP, the GP mechanism allowing for maximum autonomy for the illustrated embodiment. This may provide TDM SSD 1204 with the authority to load and/or install various executables and/or data files as commanded by TD AP 1202. Embodiments may include the decision to perform the loading and/or subsequent installation with or without token usage. Depending on the use case context of the installation, any one of the configurations defined herein may be assumed and/or the process may change accordingly.

The installation may include one or more of the following steps. At 1206, the TD AP 1202 may send a request token to CI SD 1200. The token may be sent at 1206 to grant TDM SSD 1204 authorized management privilege (AMP). The CI SD 1200 may verify the token, and, in response and after considering its security policy, may grant TDM SSD 1204 AMP. Thus, the TDM SSD 1204 may be in a PERSONAL- IZED state and may accept personalization commands from the TD AP 1202. Also, after TDM SSD 1204 acquires AMP, it may load S/W executables and configure applications such as SDs within its own hierarchy for example.

At 1208 (shown in FIG. 12A) a command may be sent to the TDM SSD 1204 by the TD AP 1202 to load the TDM load file which may contain the installable S/W and/or data files to configure the desired set of trusted domains. As shown in FIG. 12B, the TDM load files 1212 may be comprised of separate modules and each file and/or S/W module may be installed with a separate command 1210. According to one embodiment as shown in FIG. 12B, application S/W corresponding to each TD type may be included in the load files 1212. For the remotely owned domains $TD_{RO}$ 1220$_{1-n}$, one generic S/W configuration may be used. Repeated instantiations of this configuration may be commanded in order to install the suggested number of domains. S/W for an extraction utility may be provided in a load file. Use of this utility is further described herein. Each TD may be associated with TDM SD 1204. The TDs, except $TD_{TDM}$ 1216, may be in a pristine (pre-RTO) state. The TDs that may be in the pristine state bare notation TD* in FIG. 12B. Although not indicated in FIG. 12B, the pristine domains may be considered to be INSTALLED, whereas $TD_{TDM}$ 1216 may be fully functional and/or application specific. The $TD_{TDM}$ 1216 may comprise security domain management (SDM) and system domain policy (SDP) information.

Given that TDM SSD 1204 may have AMP, it may be self-associated. As illustrated in FIG. 12B, the TDM SSD 1204 may lie at the top of the SD hierarchical tree. The $TD_{TDM}$ 1216 may serve as the manager application for subsequent development of the applications residing in the SD hierarchy. The $TD_{TDM}$ 1216 may use the security services provided by TDM SSD 1204 to serve as the manager application. FIG. 12 shows the trusted domains associated with TDM SSD 1204 as opposed to each such application associated with separate SDs. The trusted domains may be supplementary to TDM SSD 1204 as depicted in the configurations as described herein. The latter configuration may be the result in this installation process. Many distinct combinations of TD applications (APPs) and/or associated SDs may be illustrated. According to one embodiment, separate TD SDs supplementary to TDM SSD 1204 may be created for remotely owned domains when registration and/or credential roll-out takes place.

At least three scenarios are described herein for TD application ownership and implications to feature porting. With regard to the stakeholders, several ownership arrangement scenarios may be devised. The CI may be viewed as an MNO and/or a financial institution such as a bank for example. The TD AP may be viewed similarly. A determination may be made as to whether these institutions or organizations are the same. Stated another way, the entity which issued the card may be the same or different than the entity which owns the TD software. Overall, the level to which TSIM functionality may be realized may be governed by the level of agreement, or the level of trust, between the CI's security policy and the TD's SDP. If the card issuer and TD AP are the same entity, then there may be a high level of policy agreement. If two issuing entities are involved, then variable policy may be expected. The policies may be CI manager level and/or TD system level. The policy issues between potentially competing remote owners in the TD context may or may not be relevant to the defined scenarios herein.

Regarding the ROs taking ownership of TDs, there may be an issue with the policy of the TD SDP versus that of the RO and not that of the CI. The card manager and/or CI may lock an application if undesirable behavior is detected.

The foregoing suggests ownership scenarios between the CI and the TD AP. According to a first scenario (Scenario 1), the CI card level security policy may closely agree and/or be compatible with the TSIM SDP. High policy agreement may imply that the CI and the TD AP are the same entity. High policy agreement may imply that the CI is sufficiently familiar with the application that granting the TD domain manager SD DMP and/or AM privilege may be highly probable. In such cases, TSIM may be given considerable leeway with the software that is loaded and how the software behaves. For example, in a use case, the CI may be an MNO which authorizes the use of the TD application. The TD AP may be either the MNO itself or an authorized third party vender for example. Scenario 1 may be an arrangement that would be most favorable to maximal porting of THSM/TSIM features to a GP framework.

According to a second scenario (Scenario 2), the CI card level security policy may partially agree with the TD SDP. Partial agreement may imply that the CI and the TD AP are different entities. If the policy level indicates that the CI and the TD AP are different entities, a more restrictive position may be taken on the level of freedom granted to the application. Thus, DMP, at most, may be granted, where the CI SD may have token verification and/or receipt generation privileges as a means of overseeing what gets loaded onto the card. In a use case, the TD application may be authorized for use by an MNO which may not be the CI but may be accorded a level of trust by the CI. The TD AP may be either the MNO itself or a third party vender authorized by the MNO. The user of the device may be able to independently download the application.

According to a third scenario (Scenario 3), the CI card level security policy may minimally agree with the TD SDP. Minimal agreement may imply that the CI SD takes a highly restrictive view of the application. Thus, neither DMP nor AM privilege may be granted to the TSIM application domain manager SD. The software may be loaded and/or verified by the CI SD. In a use case, the TD application may be authorized for use by an MNO which is not the CI and/or is not accorded a high level of trust by the CI. According to an embodiment, the TD AP may be either the MNO itself or a third party vender authorized by the MNO. The user of the device may be allowed to independently download the application. However, in such cases the CI may overrule a decision, made by a subsidiary SD, to allow a download for example. If an SD with AM privilege makes the decision to download, the application may be transitioned to a LOCKED state by the system (e.g., OPEN, the CI SD or any SD with the privilege to do so) after download and/or subsequent activation.

With respect to the ownership options described above, the stakeholder may be the user. The user may be viewed, somewhat abstractly, and may assume different roles. The user may be the CI, terminal owner, simultaneously the CA and terminal owner, and/or the DO.

The ease with which TSIM features may be ported to GP may depend on the stakeholder ownership options and/or the accommodation level of the policies associated with the stakeholders. The CI may have a security policy governing the behavior of application running on the card.

A description of the porting of TD features, such as RTO, Registration and/or Rollout, and/or Migration for example, under Scenario 1 is provided herein. According to an embodiment, there may be porting procedures for at least three features of THSM/TSIM. As described herein, the features of trusted domains may be defined as they are conceived in the THSM environment. The features to be ported may include: 1) RTO, 2) registration and/or credential roll-out, and/or 3) migration. The CI may give AMP to the TDM SD, regardless of the ownership scenario (Scenario 1, 2, or 3 described above). This way, under (or specific to) each scenario, the TDM may have more autonomy, as compared to the case where the TDM will have DMP, for example. Under Scenario 2 and/or Scenario 3, CI's granting of AMP may be less likely or realistic than under other embodiments. Porting descriptions are further described herein. The presentation mode shows the messaging between the various entities in the SD/APP hierarchy on-card and those entities with the off-card AP. The AP may be any remote owner, including the CI for example.

Figure 13:
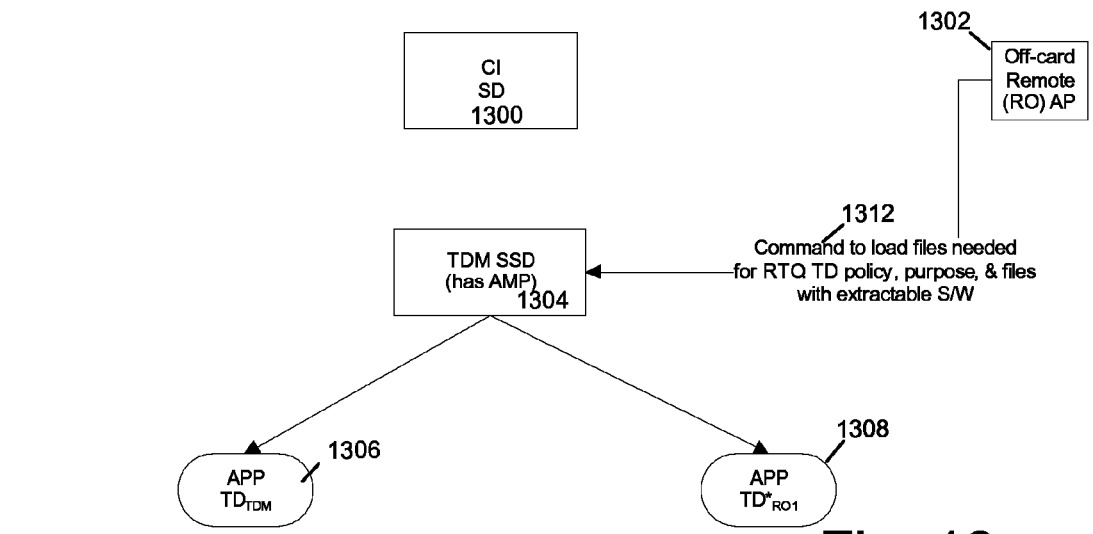
FIGS. 13 and 13A show a diagram illustrating a sequence for RTO porting.
Figure 13A:
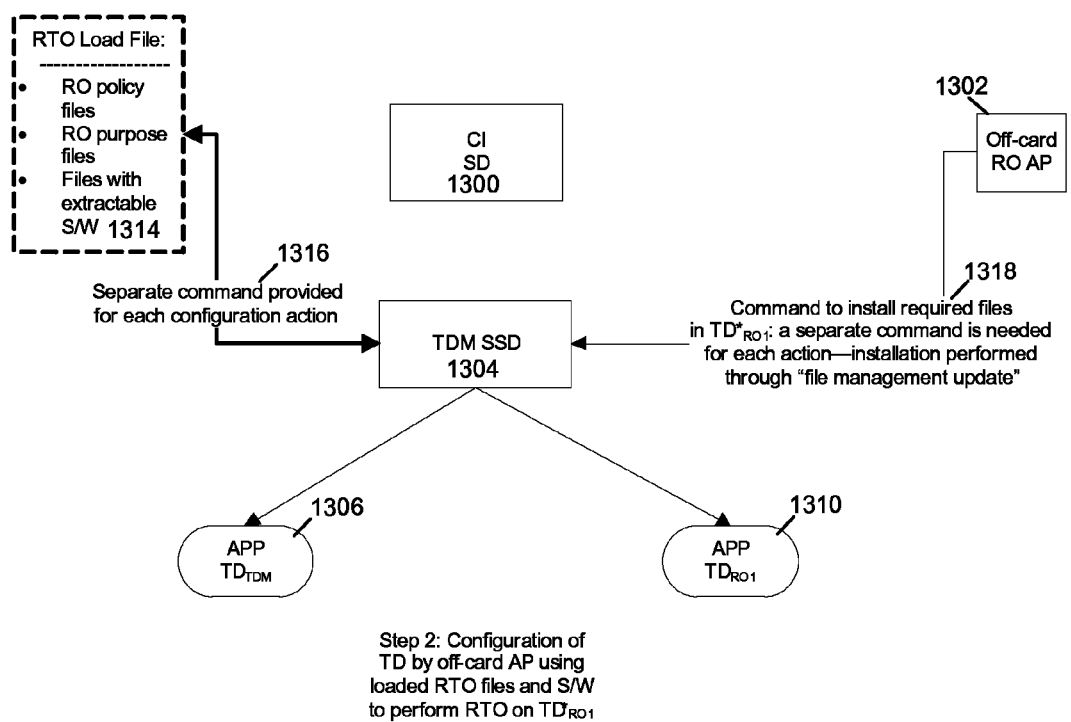

An exemplary RTO process is illustrated in FIGS. 13 and 13A. The remote owner may be an application provider wishing to take ownership of a TD that is in a pristine state (e.g., APP TD$^*_{RO1}$ 1308) at the start of the protocol. The RO AP 1302 may be regarded as any service provider. If the CI 1300 and/or the TD AP (same or different from the CI) want to take ownership of a TD they, like any other remote owner, may proceed as per the RTO. The steps are described below (and are not limited to a particular order).

With regard to step 1, a request 1312 may be made by the RO AP 1302 to the TDM SD 1304 to load the RTO load files. The request may be granted if the RO policy and/or the TD SDP are sufficiently compatible. It may be possible for a negotiation to occur. FIGS. 2 and 2A, described herein, provide a flow diagram of an exemplary RTO protocol. For example, the RO AP 1302 may agree to conform to SDP/card policy restrictions. After the policy check is performed, the TDM SD 1304 may load the RTO files as requested by the RO AP 1302. The application TD TDM 1306 may contain the TDM configuration and policy (e.g., SDM and SDP) information.

With regard to step 1312 illustrated in FIG. 13A, pristine TD$^*_{RO}$ 1308 may become TD$_{RO}$ 1310 (owned, not pristine) in this step. A request at 1318 may be made to install RTO load files 1314 of varying content such as policy and/or purpose files and/or files containing extractable S/W. The executables in the latter files may be extracted by the extraction utility with which the pristine domains may be equipped during TD APP installation (see FIG. 12 for example). The configuration intelligence may be maintained by the off-card RO AP 1302 and/or the state of the owned trusted domain upon RTO completion may be PERSONALIZED. When the RTO files 1314 are installed, the application may become fully functional as pre-registered remotely owned TD. The application may make a decision as to whether tokens are used in the RTO. The executable extracted mechanism may be a workaround to avoid the GP restriction on S/W updates to an on-card application. Without the use of the extraction mechanism, executables may have to be erased and/or replaced by new S/W.

Figure 14:
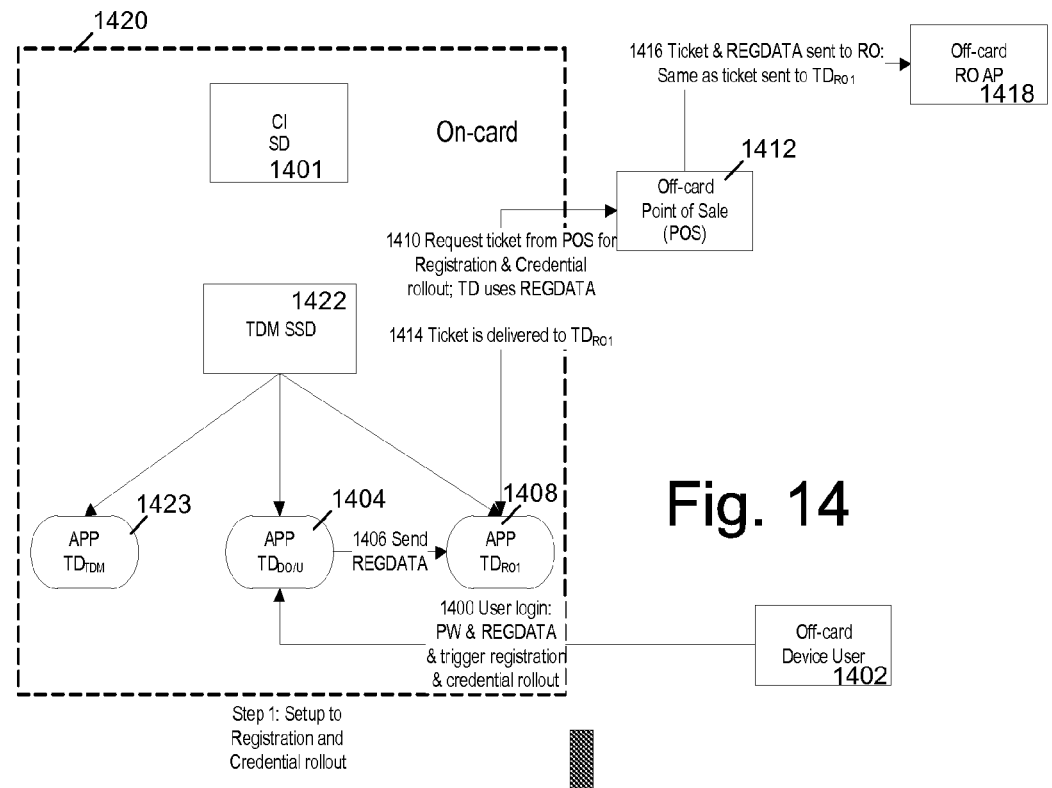
FIGS. 14 and 14A show a diagram illustrating registration and/or credential roll-out protocol.
Figure 14A:
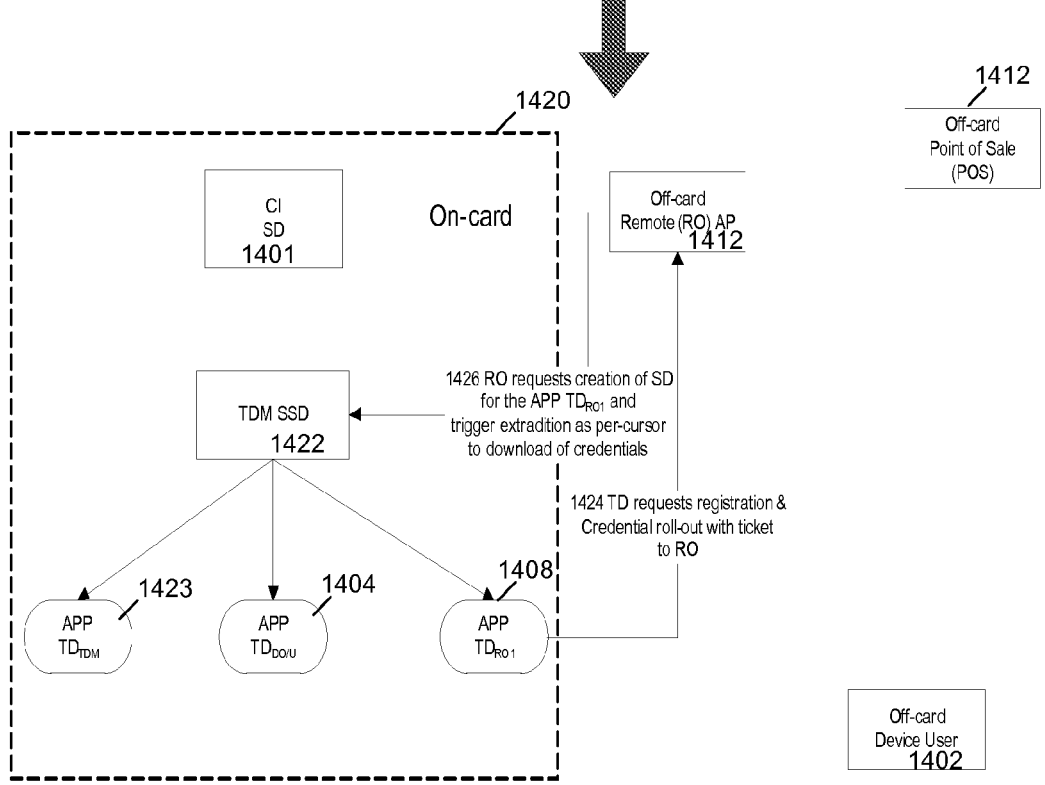
Figure 15:
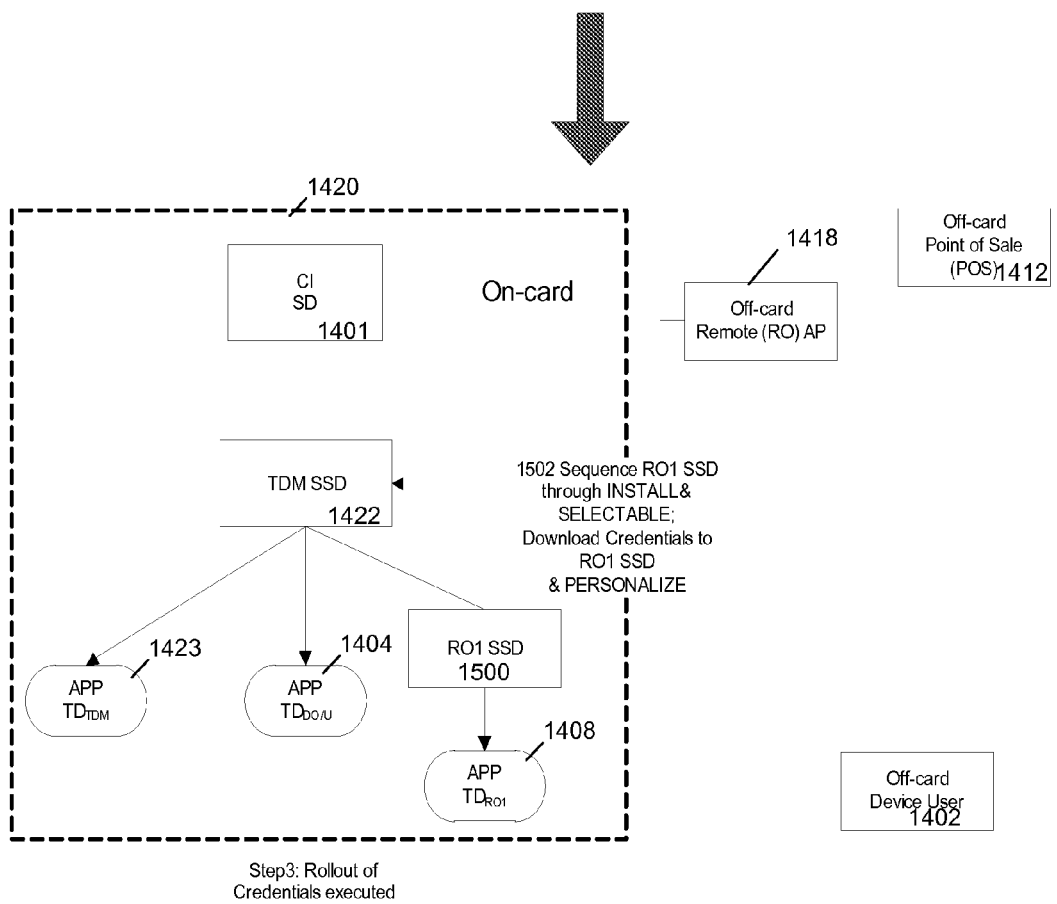
FIG. 15 is a diagram illustrating a continuation of the registration and/or credential roll-out protocol of FIGS. 14 and 14A.

The registration and/or credential roll-out protocol may be performed on TDs that are owned through take ownership processes, such as RTO for example. FIGS. 14, 14A, and 15 illustrate one embodiment in which the registration and/or credential roll-out is performed. FIGS. 14 and 14A illustrates the registration and/or credential roll-out for steps 1 and 2 (which are not limited to a particular order). This protocol may be implemented as envisioned in a THSM environment for example.

As illustrated in FIG. 14, step 1 may include additional sub-steps (which are not limited to a particular order). In sub-step 1400, a user 1402 may login with username and/or password and/or the submission of user personal data (REG-DATA) to TD$_{DO/U}$ 1404 of which the TD owner/user may have previously taken ownership (not shown). In sub-step 1406 the TD$_{DO/U}$ 1404 may send the REGDATA on-card to TD$_{RO1}$ 1408. At sub-step 1410, TD$_{RO1}$ 1408 may use the user data to request a registration ticket from the point of sale (POS) 1412. The POS 1412 may have requested and received from the RO 1418 an indexed set of tickets. Each ticket may comprise non-key credentials including an IMSI value. In sub-step 1416, the POS 1412 may select an unused ticket and/or send it and/or REGDATA to the RO 1418. In sub-step 1414, the identical ticket may be sent to TD$_{RO1}$ 1408. The POS 1412 may request and/or receive an indexed set of tickets from the RO 1418 for use in providing to the RO 1418 a ticket dispensing service. One such ticket may be used in this protocol. The communication between on-card entities 1420 and off-card entities may be protected by TDM SD 1422. The application TD$_{TDM}$ 1423 may contain the TDM configuration and policy (e.g., SDM and SDP) information.

As further illustrated in FIG. 14A, step 2 may include two steps in preparation for the download to an SD, which may be about to be created by TDM SSD 1422 and may be associated with TD$_{RO1}$ 1408 and/or may be the holder of its credentials. Thus, in sub-step 1424 the TD 1408 may send the ticket to the RO 1418 in requesting download of credentials. The RO 1418 may have mapped the REGDATA with the ticket and/or REGDATA information sent in 1416 from the POS 1412. In sub-step 1426 the RO may request that TDM SSD 1422 create an SD and/or that TD$_{RO1}$ 1408 be extradited to it. The created SD may contain the TSIM credentials for TD$_{RO1}$ 1408, which may give it use of its security services.

FIG. 15 illustrates the registration and/or credential roll-out which may be performed in step 3 of a process according to one embodiment. The created SD (RO1 SSD 1500) which may be associated with TD$_{RO1}$ 1408 may be created, installed, made selectable, and/or personalized. TD$_{RO1}$ 1408 may be extradited to RO1 SSD 1500, which may make its security services available. As illustrated in 1502 of FIG. 15, the requested credentials may be downloaded to RO1 SSD 1500, which may give TD$_{RO1}$ 1408 TSIM functionality. Possible credentials may include an authentication key, an integrity key, a ticket including IMSI, or the like. The requested credentials may comprise symmetric key pairs or a PKI.

Figure 16:
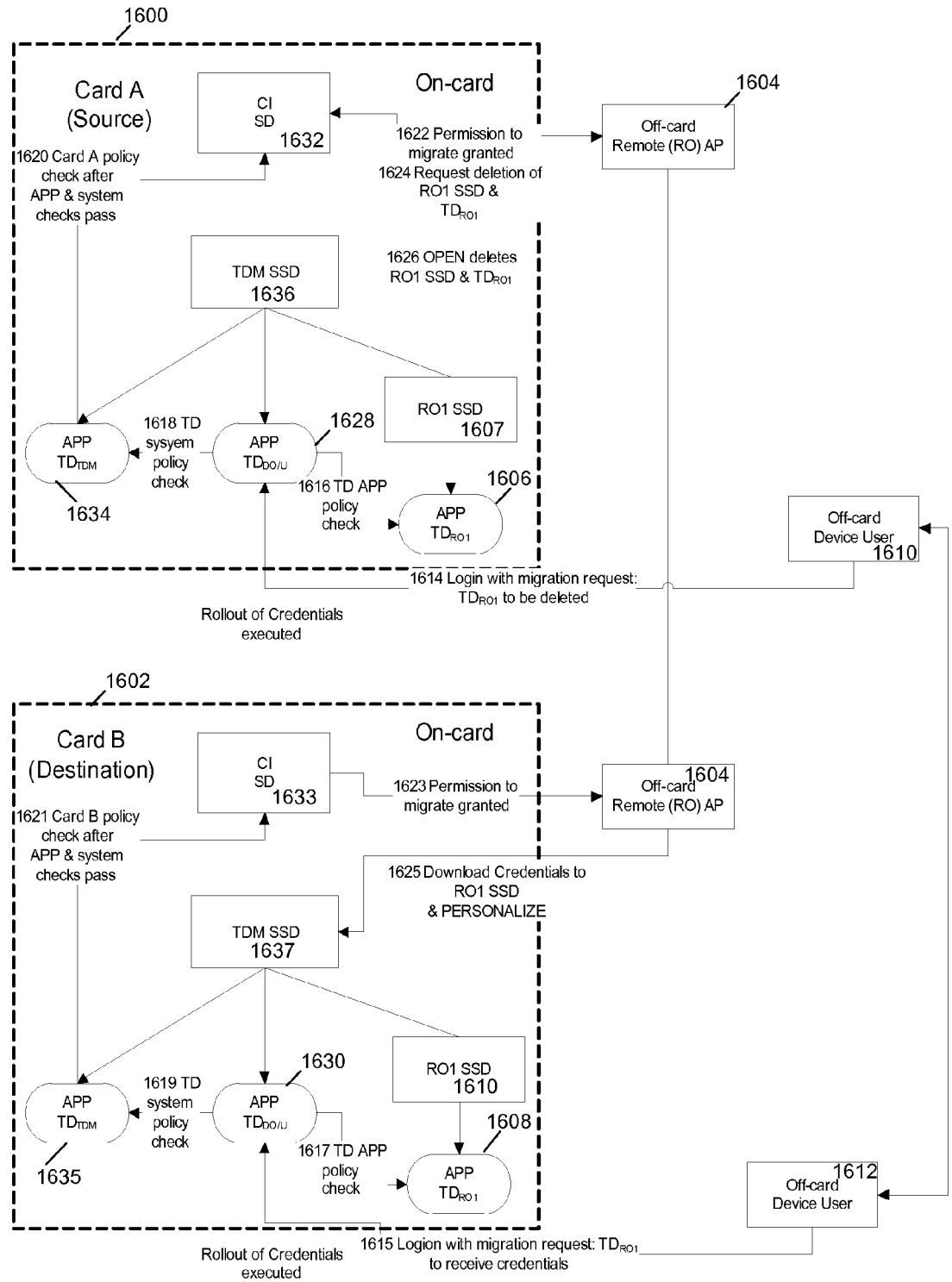
FIG. 16 is a diagram illustrating a modified migration process for moving credentials from a source card to a destination card.

According to an embodiment, FIG. 16 illustrates a modified migration by moving credentials from a source card 1600 to a destination card 1602. In FIG. 16, an exemplary migration of credentials from a source card (A) 1600 to a destination card (B) 1602 is presented. The process is illustrated via a series of steps (not limited to a particular order) which are outlined on both cards. The method shown reflects an exemplary condition in GP that there may be no direct peer-to-peer communication between the source card 1600 and the destination card 1602. Thus a direct transfer of data may be prohibited. A deletion on the source card 1600 followed by a load and/or install on the destination card 1602 of the credentials may be the mechanism by which the transfer takes place.

Described herein are assumptions which may be taken into consideration with regard to the migration. For example, the remote owner AP 1604 may be the same for both cards in an embodiment. Thus, there may be no transfer of secrets from one owner to another. According to one embodiment, ownership of the destination TD TD$_{RO1}$ 1608 may be taken by the RO 1604 (e.g., via RTO) before the migration starts. In an embodiment, creation of and the extradition of TD$_{RO1}$ 1608 to RO1 SSD 1610 may have taken place before the migration starts. Both RO1 SSD 1610 and/or TD$_{RO1}$ 1608 may be SELECTABLE when the migration starts. The card A user 1610 may be different from card B user 1612, and they may both agree on the migration before it may take place. The users may login to their respective devices and/or request migration before the protocol can run to completion. Although not shown, more than one TD may be remotely owned on either or both cards. Thus other TDs, such as remotely owned TDs for example, may be present that may not be involved in the migration. In this connection it may be assumed that the RO whose credentials are being transferred came to remotely own the TD on the destination card 1602 for the purpose of the migration.

According to an embodiment, at 1614 and 1615 both users (or user) may login to the TD $TD_{DO/U}$ which they may own (e.g., $TD_{DO/U}$ 1628 and $TD_{DO/U}$ 1630) through RTO and/or request migration. An exemplary login may contain information indicating which TD APP may be targeted for the migration. For example, $TD_{RO1}$ 1608 may be targeted for migration.

At 1616, 1618 and/or 1620 for the source card 1600, and steps 1617, 1619, and/or 1621 for the destination card 1602, the various policies regarding migration may be checked. For example, the $TD_{DO/U}$ 1628 may perform a TD system policy check on the domain manager TD In an embodiment with a single owner, the APP policy may be the same for both cards. The trusted domain system policies (involving SDP) and/or the card level policies may be different in comparing the two cards. Policy levels may be amenable to the migration so that it may be allowed to go forward.

At 1622 (1623 in destination card 1602), the CI SD 1632 (CI SD 1634 in destination card 1602) may grant permission for the migration to the RO 1604. The RO 1604 may decide not to proceed with the migration after receiving permission from both cards. The RO 1604 may request that OPEN delete RO1 1607 and $TD_{RO1}$ 1606 on the source card 1600 in step 1624 and/or OPEN may perform a delete operation in step 1626.

The RO 1604 may request the loading and/or installation of credentials on the destination card 1602 in step 1625. These credentials may be a copy of those that existed on the source card 1600 and/or they may be known by the RO 1602. Exemplary credentials include an authentication key, an integrity key, and personalization data. A DAP check may be performed on the load file containing the credentials before installation occurs.

In one embodiment, the GP operating environment may not permit some of the trusted domain features (such as integrity checking, RTO, registration and/or credential roll-out, and/or migration for example) when the application's associated SD is not allowed to extradite to itself (e.g., be self-associated). The privilege of being self-associated may enable the implementation of these THSM/TD features on a GP card application. More details concerning the allowed TSIM behaviors are provided herein in relation to various porting options.

Described herein is an assessment of TD application features to be ported according to an embodiment in which the CI card level security policy may closely agree and/or be compatible with the TSIM SDP (e.g., Scenario 1 discussed above). For example, the CI and the RO may be the same so their policies may be compatible. In an exemplary embodiment, the CI SD may grant a high level of autonomy to the TDM SD, which may lie at top of the trusted SD hierarchy. A high level of autonomy may mean that AMP is granted or DMP is granted. With regard to porting integrity trust mechanisms under Scenario 1, load-time DAP may be performed, but run-time integrity may not be performed. In an embodiment, the RTO trusted domain feature, under Scenario 1, may be ported under TD policy compatibility checks between SDP and/or the policy of the RO. For example, the S/W suite installed in the trusted domain to be owned may include an extractor of executables from a load file that may also contain RO policy and/or purpose files, and the extractor may be used when the credentials are loaded and/or installed. User registration and remote credential rollout may also be allowed according to an embodiment under Scenario 1. For example, the policy may allow the RTO to execute the user registration and remote credential rollout feature. During the execution of this feature, an SD may be created for the TD APP to which the roll-out may be targeted. The APP which may be initially associated with TDM SD may be extradited to the newly created SD, and the credentials may be installed in the new SD while executables may be extracted into the TD APP. In accordance with an embodiment, the TSIM application migration feature may be ported and modified under Scenario 1. Policy compatibility checks may involve multiple entities such as source and/or destination TDD APPs; source and/or destination SDPs; source and/or destination CI SD policies; and/or user preferences if two users are involved, for example. A deletion of the source credentials followed by a copy to the destination, with the RO as the facilitator, may be the mechanism used for TSIM application migration in one embodiment.

As described herein, the TD Application features may be ported under Scenario 2 in which the CI card level security policy may partially agree with the TD SDP. According to Scenario 2, a GP card issuer may grant the TD application security domain at the top of the SD tree delegated management privilege (DMP). The GP card issuer may not grant AMP. In this case, it may be possible for the TDM SD to extradite to itself (and/or self-associate). As such, the TDM SD may configure itself according to its own configuration management system. If self-association does occur then the SD may have the equivalent of AMP. However, according to one embodiment, the application SD may not be extradited without receiving a token for such an operation from the CI and/or a controlling authority. Configuration and/or state changes may involve receipt generation by the CI for the purpose of keeping track of such changes on the card. Thus, the CI may oversee TD APP activities when no AMP is granted. For this option it may be assumed that there is no self-association and thus the TDM SD may not have the same autonomy it would have with AMP. The domain manager TD APP may not manage the remotely owned TDs with the autonomy employed in certain illustrations described herein.

Trusted domain features may be ported under Scenario 2. With regard to integrity trust mechanisms under Scenario 2, load-time DAP may be performed, but run-time integrity checking may not be performed. For example, CI and the RO may be different and/or their policies may possess some level of compatibility in the event that the RO is trusted under Scenario 2. In one embodiment under Scenario 2, the RTO feature may be allowed under usual TD policy compatibility checks between SDP and/or the policy of the RO. In an example embodiment, CI SD security policy may be more likely to disallow the TRO procedure under Scenario 2 than in Scenario 1. The S/W suite installed in the trusted domain to be owned may include an extractor of executables from a load file that may contain RO policy and/or purpose files, and the extractor may be used when the credentials are loaded and/or installed. The CI SD may have more control of the loading processes given that with DMP the CI may have token verification and/or receipt generation privileges. In one embodiment, the user registration and/or remote credential rollout feature is allowed under Scenario 2. For example, an SD may be created for the TD APP to which the roll-out may be targeted. The APP, which may be initially associated with TDM SD, may be extradited to the newly created SD. The credentials may be installed in the created SD while executables may be extracted into the TD APP. Although the extraction mechanism may work around the GP restriction on the introduction of S/W, there may be a greater likelihood with Scenario 2 that the APP may be LOCKED when the S/W starts to execute. In accordance with an embodiment, the TSIM application migration feature may be ported and modified under Scenario 2. For example, there may be no bather on the source side but there may be a policy stopper on the destination side. Policy compatibility checks may involve multiple entities such as source and/or destination TDD APPs; source and/or destination SDPs; source and/or destination CI SD policies; and/or user preferences if two users are involved, for example. A deletion of the source credentials followed by a copy to the destination, with the RO as the facilitator, may be the mechanism used for TSIM application migration in one embodiment under Scenario 2.

As described herein, the TD Application features may be ported under Scenario 3 where CI card level security policy minimally agrees with the TD SDP. In Scenario 3, CI and/or the RO may be different and/or the trust level regarding the RO may be minimal so their policies may be minimally compatible. According to Scenario 3, the GP CI may not grant the TD SD DM privilege. With this security mechanism in place, application content may be handled with the CI's oversight. Before applications and/or configuration files are loaded, tokens may be provided and/or verified by the CI SD. The CI SD may be the entity responsible for executing the loading and/or installation of configuration files and applications. Operations requested by the application provider, or RO AP for example, may go through the CI SD. This may be one of the more restrictive porting options described herein.

Trusted domain features may be ported under Scenario 3. For example, integrity trust mechanisms may be ported. Load-time DAP may be performed, but run-time integrity checking may not be performed. In one embodiment under Scenario 3, the RTO may be allowed under usual TD policy compatibility checks between SDP and/or the policy of the RO. With Scenario 3, much of TD APP capabilities may be reduced such that multiple features may be disallowed. Thus at least one TD may be remotely owned. The S/W suite installed in the trusted domain to be owned may include an extractor of executables from a load file that may contain RO policy and/or purpose files, and the extractor may be used when the credentials are loaded and installed. The loading of these files may be the direct responsibility of the CI SD according to an embodiment under Scenario 3. In one embodiment under Scenario 3, the user registration and remote credential rollout trusted domain feature may be allowed, but may occur less often given that RTO may occur less often, and the policy checks employed for RTO may provide the go-ahead for this feature. During the execution of this feature a new SD is created for the TD APP to which the roll-out is targeted. The APP which is initially associated with TDM SD is extradited to the newly created SD, and the credentials are installed in the new SD while executables are extracted into the TD APP. Although the extraction mechanism may work around the GP restriction on the introduction of new S/W, there may be a greater likelihood with Scenario 3, as compared to Scenario 2, that the APP may be LOCKED when the S/W starts to execute. According to one embodiment, the TSIM migration feature is allowed but is modified under Scenario 3. For example, the presence of an already existing RO (different from the RO effecting the migration) on the destination may prevent a TSIM migration process from running to completion.

According to one embodiment, THSM/TD functionality may contain the element of trust which may be dependent on the several roots of trust (such as RTR, RTV, RTS, and/or RTM for example) that may be critical for a trusted environment. Thus, for the above porting exercises of the TD features, particularly regarding PTO, the absence of such trust support mechanisms may weaken the card's security structure. For example, the card's security structure may be weakened from the standpoint of the remote owner. The ability to attest to the integrity of the card configuration, based on a solid root of trust, may be an important policy consideration of the RO. Even if the CI is confident of the integrity of the card's content the RO may not be assured of that same level of confidence or trust. This may potentially be an inhibiting factor for the RO that may be deciding if it is going to proceed with RTO.

According to one embodiment, integrity checking may be used by any device that the employs the trust mechanisms consistent with mobile trusted module (MTM) capabilities. Thus THSM/TD may not function as it is designed to in the GP environment with regard to attesting trust levels. However, as described herein, a security domain hierarchy may be established once the TDM's SD has been created and/or PERSONALIZED under the direction of the CI SD and/or given AMP. A weakened trust level may be mitigated if a TD system level policy written into SDP performs DAP checking of TD files being loaded onto the card. Moreover, even though it may not have to employ token verification and/or receipt generation when it has been granted AMP, the DMP SD may employ such mechanisms nonetheless and/or make them part of its policy requirements. Thus, with RTO and credential roll-out files handled in this manner, and being guaranteed that such mechanisms are in place through policy SDP policy requirements, the RO may have a sufficient level of trust with the card configuration to proceed with RTO and credential download. For example, the security procedures in place may serve as a substitute for MTM capabilities.

For Scenario 2 and/or Scenario 3, there may be a reliance on the card manager policies in a CI SD, with less autonomy on the part of the TDM SD. The CI may have the token verification privilege and/or receipt generation privilege and thus may have direct oversight of the loading processes. For remote owners other than the CI, the policy negotiations may be oriented towards the card manager. This may not mean less security in terms of trust. The CI may request even more stringent security procedures be imposed. Apart from the trust issue this may result in restrictions on the number of remote TD owners.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A mobile wireless communications device having a processor and a memory, the mobile wireless communications device comprising:
   a plurality of domains residing on the mobile wireless communications device, wherein the plurality of domains are supported by at least one platform, each domain of the plurality of domains comprising a configuration of computing resources executing on the at least one platform and each domain of the plurality of domains having a domain owner, wherein each domain of the plurality of domains is configured to perform functions for its domain owner and wherein each domain owner may specify policies for operation of its domain;
   a security domain being one of the plurality of domains, wherein the security domain is configured to determine a level of trust between an external stakeholder and the security domain; and
   a system-wide domain manager being resident on another one of the plurality of domains, wherein the domain on which the system-wide domain manager resides is subsidiary to the security domain, the system-wide domain manager being configured to enforce the policies on one or more subsidiary domains of the plurality of domains based on a privilege level received from the security domain, the privilege level based on the level of trust between the external stakeholder and the security domain,
   wherein, when a policy of the security domain conflicts with a policy of the domain on which the system-wide domain manager resides, the system-wide domain manager is further configured to enforce the policy of the security domain.

2. The device of claim 1, wherein the external stakeholder is an application provider of an application on the device.

3. The device of claim 2, wherein the security domain is a card issuer security domain that is owned by a card issuer.

4. The device of claim 1, wherein the external stakeholder comprises an owner of at least one of the one or more subsidiary domains.

5. The device of claim 1, wherein the security domain and the system-wide domain manager reside on a global platform (GP) compliant card.

6. The device of claim 1, wherein the plurality of domains reside on a global platform (GP) compliant card, each domain being configured to communicate with one or more off-card entities.

7. The device of claim 1, wherein the privilege level comprises at least one of a delegated management privilege or an authorized management privilege.

8. The device of claim 7, wherein the delegated management privilege and the authorized management privilege are each configured to enable the system-wide domain manager to enforce the policies with a corresponding level of autonomy.

9. The device of claim 8, wherein the level of autonomy corresponding to the authorized management privilege is greater than the level of autonomy corresponding to the delegated management privilege.

10. The device of claim 1, wherein each domain is associated with a state, and wherein each associated state is one of an installed state, a selectable state, a personalized state, or a locked state.

11. The device of claim 1, the device further comprising:
one or more applications loaded onto at least one of the one or more subsidiary domains of the system-wide domain manager, the one or more applications each associated with a state, wherein each associated state is one of an installed state, a selectable state, a personalized state, or a locked state.

12. The device of claim 11, wherein one of the one or more applications is configured to change the associated state to another state according to an indication from a controlling authority, wherein the other state and the indication from the controlling authority are based on the privilege level, and wherein the controlling authority is one of the security domain or the system-wide domain manager.

13. The device of claim 1, wherein the system-wide domain manager is further configured to:
   enforce the policies for operation of the domain on which it is resident;
   coordinate the enforcement of respective policies of the subsidiary domains in relation to the domain in which the system-wide domain manager resides; or
   coordinate interaction among the subsidiary domains in accordance with their respective policies and the policies of the domain on which the system-wide domain manager resides.

14. In a mobile wireless communications device comprising a processor, a memory, and a plurality of domains residing on the mobile wireless communications device, wherein the plurality of the domains are supported by at least one platform, each domain of the plurality of domains comprising a configuration of computing resources executing on the at least one platform and each domain of the plurality of domains having a domain owner, and wherein each domain owner may specify policies for operation of its domain, a method comprising:
   determining, by a security domain, a level of trust between an external stakeholder and the security domain, wherein the security domain is one of the plurality of domains;
   enforcing, by a system-wide domain manager residing on another one of the plurality of domains that is subsidiary to the security domain, the policies on one or more subsidiary domains of the plurality of the domains based on a privilege level received from the security domain, wherein the privilege level is based on the level of trust between the external stakeholder and the security domain; and
   when a policy of the security domain conflicts with a policy of the domain on which the system-wide domain manager resides, enforcing, by the system-wide domain, the policy of the security domain.

15. The method of claim 14, further comprising:
   enforcing, by the system-wide domain manager, the policies of the domain on which the system-wide domain manager is resident;
   coordinating, by the system-wide domain manager, the enforcement of respective policies of the subsidiary domains in relation to the domain in which the system-wide domain manager resides; or
   coordinating, by the system-wide domain manager, the interaction among the subsidiary domains in accordance with their respective policies and the policies of the domain in which the system-wide domain manager resides.

16. The method of claim 13, wherein the external stakeholder is an application provider of an application on the one or more devices.

17. The method of claim 13, wherein the security domain is a card issuer security domain that is owned by a card issuer.

18. A mobile wireless communications device having a processor and a memory, the mobile wireless communications device comprising:

a plurality of domains residing on the mobile wireless communications device, wherein the plurality of domains are supported by at least one platform, each domain of the plurality of domains comprising a configuration of computing resources executing on the at least one platform and each domain of the plurality of domains having a domain owner, wherein each domain of the plurality of domains is configured to perform functions for its domain owner, and wherein each domain owner may specify policies for operation of its the domain;

a card issuer security domain of a global platform (GP) compliant card being one of the plurality of domains, wherein the card issuer security domain is configured to determine a level of trust between an external stakeholder and the card issuer security domain; and a system-wide domain manager being resident on another one of the plurality of domains, wherein the domain on which the system-wide domain manager resides is subsidiary to the card issuer security domain, the system-wide domain manager being configured to enforce the policies on one or more subsidiary domains of the plurality of domains based on a privilege level received from the card issuer security domain, and wherein the privilege level is based on the level of trust between the external stakeholder and the card issuer security domain, wherein, when a policy of the security domain conflicts with a policy of the domain on which the system-wide domain manager resides, the system-wide domain manager is further configured to enforce the policy of the security domain.

* * * * *